(12) United States Patent
Arai et al.

(10) Patent No.: US 7,604,764 B2
(45) Date of Patent: Oct. 20, 2009

(54) METHOD OF MOLDING HOLLOW COMPONENT WITH HIGH STRENGTH AND SEALABILITY AND THE HOLLOW COMPONENT

(75) Inventors: Tsuyoshi Arai, Kariya (JP); Kiyomi Nagai, Okazaki (JP); Naoyuki Ito, Toyoake (JP); Kiyoshi Nagata, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/850,597

(22) Filed: May 19, 2004

(65) Prior Publication Data

US 2004/0234712 A1    Nov. 25, 2004

(30) Foreign Application Priority Data

May 22, 2003    (JP)    ............................. 2003-145283

(51) Int. Cl.
B29C 45/14    (2006.01)
B28B 7/22    (2006.01)
B29C 45/00    (2006.01)

(52) U.S. Cl. ........................ 264/263; 264/250; 264/255; 264/261; 264/266; 264/273; 264/274; 264/275; 264/297.2; 264/297.8; 264/328.8; 264/328.11; 425/121; 425/123; 425/125; 425/127; 425/129.1; 425/572; 425/574; 425/575

(58) Field of Classification Search ........................ None
See application file for complete search history.

(56) References Cited

U.S. PATENT DOCUMENTS

| | | | |
|---|---|---|---|
| 4,544,588 A | * | 10/1985 | Schauf ........................ 428/35.7 |
| 5,221,538 A | * | 6/1993 | Gasami et al. ............... 425/127 |
| 6,117,380 A | * | 9/2000 | Shirai et al. ................. 264/250 |
| 6,210,619 B1 | * | 4/2001 | Owens ........................ 264/255 |
| 6,372,170 B1 | * | 4/2002 | Nishida et al. .............. 264/255 |
| 6,428,730 B1 | * | 8/2002 | Nishida ....................... 264/255 |

(Continued)

FOREIGN PATENT DOCUMENTS

JP    04-279317    10/1992

(Continued)

OTHER PUBLICATIONS

English Translation of Office Action dated Apr. 10, 2009 in Chinese Application No. 2004 100446269.*

(Continued)

*Primary Examiner*—Jeffrey Wollschlager
(74) *Attorney, Agent, or Firm*—Harness, Dickey & Pierce, PLC

(57) ABSTRACT

Division members (31, 32) separately molded to form a hollow component are brought into contact with each other and are arranged in dies (14, 24). The peripheral edge of the contact parts is formed with a peripheral edge path (330) to be filled with a molten resin. In the peripheral edge path (330), protrusions (316, 326) are projected from the division members (31, 32) continuously over the whole periphery of the peripheral edge path (330). The molten resin is filled in the peripheral edge path 330, and is welded with the protrusions (316, 326). As a result, a weld structure is obtained in which portions having a high welding strength are continuously formed over the whole periphery of the peripheral edge path (330).

5 Claims, 17 Drawing Sheets

U.S. PATENT DOCUMENTS 6,604,500 B2 * 8/2003 Miyahara et al. ....... 123/184.61

FOREIGN PATENT DOCUMENTS

| JP | 04-331131 | 11/1992 |
| JP | 06-297501 | 10/1994 |
| JP | 7-75870 | 8/1995 |
| JP | 2002-113785 | 4/2002 |
| JP | 2002-225080 | 8/2002 |
| JP | 2002-370250 | 12/2002 |

OTHER PUBLICATIONS

Office Action issued in corresponding JP Application No. 2003-145283 dated Jul. 4, 2007.
Office Action from corresponding Japanese Application No. 2003-145283 dated Dec. 18, 2007 with English translation.
Office action dated Aug. 14, 2008 in Chinese Application No. 2004 100446269 with English translation.
Office action dated Apr. 10, 2009 in Chinese application No. 2004 100446269.

* cited by examiner

METHOD OF MOLDING HOLLOW COMPONENT WITH HIGH STRENGTH AND SEALABILITY AND THE HOLLOW COMPONENT

BACKGROUND OF THE INVENTION

1. Field of the Invention

The present invention relates to a method of molding a hollow component by welding a plurality of division members and a hollow component molded by the molding method.

2. Description of the Related Art

A conventional method of molding a hollow component is disclosed in Japanese Examined Patent Publication (Kokai) No. 7-75870 (Reference 1). In this conventional molding method, a plurality of division members of a prospective hollow component are molded independently of each other and brought into contact with each other in a mold. A molten resin is injected and filled in the resin path along the peripheral edge of each of the contact parts, and the division members are welded with each other through the filled resin, thereby molding a hollow component.

The surface of each division member formed with the resin path is uneven in the direction at right angles to the length of the resin path, so that the resin path is curved longitudinally. As a result, the weld joint area is increased for an improved welding strength between the division members.

In the prior art described above, however, in spite of the fact that the overall welding strength of the division members (the total joint welding strengths) can be improved by an increased weld joint area, the problem is posed that sealability cannot be easily secured at the weld parts.

On the surface of the resin path of the division members, protrusions have a comparatively large surface-to-volume ratio of the resin (the ratio of the area in contact with the molten resin to the volume receiving heat from the molten resin) and, therefore, are often high in welding strength, while depressions having a comparatively small surface-to-volume ratio of the resin are often low in welding strength.

In the conventional technique, therefore, there is a defect that the welding strength of the weld parts of the hollow component are liable to change along the length of the resin flow path, thereby making it difficult to secure a steady sealability.

SUMMARY OF THE INVENTION

This invention has been achieved in view of the above-mentioned problem, and the object thereof is to provide a method of molding a hollow component, and a hollow component, in which the overall welding strength and sealability can be secured in a steady fashion at the weld parts of the division members.

In order to achieve the object described above, according to a first aspect of the invention, there is provided a method of molding a hollow component, comprising:

a molding step for molding a plurality of division members (31, 32) of a prospective hollow component (3);

a flow path forming step for arranging the plurality of the division members (31, 32) in contact with each other, in a mold (A) and for forming a resin path (330) along a peripheral edge of each contact part of the plurality of the division members (31, 32) after the molding step; and a welding step for filling molten resin in the resin path (330) and for welding the plurality of the division members (31, 32) with each other through the filled molten resin (33) after the flow path forming step;

wherein the molding step includes the step of forming protrusions (316, 326) continuously over a length of the resin path (330) at portions of the plurality of the division members (31, 32) formed in the resin path forming step; and wherein the welding step includes the step of welding the protrusions (316, 326) and the resin (33) filled in the resin path (330) with each other.

As a result, a weld structure is obtained which has portions of high welding strength formed continuously over the longitudinal direction of the resin path (330). Therefore, the overall welding strength and sealability can be positively secured at the weld parts of the division members (31, 32).

According to a second aspect of the invention, there is provided a method of molding a hollow component, in which the molding step includes the step of forming protrusions (316, 326) over the entire periphery of each resin path (330).

In this aspect of the invention, a weld structure is obtained which has portions of high welding strength continuously formed along the length of the entire periphery of the resin path (330). Therefore, the overall welding strength and sealability can be secured at the weld parts between the division members (31, 32).

According to a third aspect of the invention, there is provided a method of molding a hollow component, wherein the protrusions (316, 326) have a substantially trapezoidal section at right angles to the length of the resin path (330).

In this aspect of the invention, the protrusions (316, 326) are liable to receive more heat from the molten resin filled in the resin path (330) and weld with the filled resin (33), at the forward end thereof. Thus, both the overall welding strength and sealability are easily and positively secured.

According to a fourth aspect of the invention, there is provided a method of molding a hollow component further comprising a protrusion (326A) having a substantially triangular section at right angles to the length of the resin path (330).

In this aspect of the invention, the protrusions (316A, 326A) are liable to positively receive the heat from the molten resin filled in the resin path (330) and to weld with the filled resin (33) at the forward side end thereof. Thus, both the overall welding strength and sealability are more easily secured and, especially, the sealability can be positively secured.

According to a fifth aspect of the invention, there is provided a method of molding a hollow component, wherein the molding step includes the step of forming a wall portion (328) for suppressing heat radiation from the molten resin to the mold (A) in the welding step, at portions of the division members (31, 32) corresponding to the resin path (330) formed in the flow path forming step.

In this aspect of the invention, the temperature drop of the molten resin flowing from the upstream to the downstream side in the resin path (330) can be suppressed in the welding step. A stable weld structure is thus easily formed along the whole periphery of the resin path (330). As a result, the overall welding strength and sealability can be positively secured more easily.

According to a sixth aspect of the invention, there is provided a method of molding a hollow component; wherein, in the welding step, an equation $W \geq F/(E \times L)$ is satisfied at all the weld parts between the protrusions (316, 326) and the resin (33) filled in the resin path (330); where W is welding width at right angles to the length of the resin path (330), F is overall welding strength required of whole weld parts of the hollow component (3), E is strength of the resin forming the division members (31, 32) or the strength of the resin (33) filled in the resin path (330), whichever is lower, and L is length of the resin path (330).

In this aspect of the invention, the required overall welding strength and sealability can be secured positively.

According to a seventh aspect of the invention, there is provided a method of molding a hollow component, wherein in the welding step welding width W at right angles to the length of the resin path (330) at all the weld parts between the protrusions (316, 326) and the resin (33) filled in the resin path (330) represents 5 to 100% of the minimum thickness (T) of the plurality of the division members (31, 32).

Generally, the minimum thickness (T) of the division members (31, 32) is determined by taking the pressure to be sealed or external forces into consideration. By setting the welding width (W) between the protrusions (316, 326) and the filled resin (33) to not less than 5% of the minimum thickness (T) of the division members (31, 32) on all weld parts, the sealability and the resistance, of the weld parts, against the external forces can be positively secured. The configuration in which the welding width (W) exceeds 100% of the minimum thickness (T) of the division members (31, 32), on the other hand, has an excessive welding strength. By reducing the welding width (W) to 100% or less of the minimum thickness (T), therefore, the hollow component (3) is prevented from becoming bulky.

According to an eighth aspect of the invention, there is provided a method of molding a hollow component; wherein the molding step includes a step of molding the plurality of the division members (31, 32) between male dies (254, 151) and female dies (153, 252) formed at different positions in the mold (A); and wherein the flow path forming step includes a step of combining the female dies (153, 252) with each other while the plurality of the division members (31, 32) formed in the molding step are left in the mold (A) and a step of arranging the plurality of the division members (31, 32) in contact with each other in the mold (A).

In this aspect of the invention, a highly productive molding method is realized, wherein the plurality of the division members (31, 32) are both molded and welded to each other in the same die, and wherein the overall welding strength and sealability at the weld parts between the division members (31, 32) can be positively secured.

According to a ninth aspect of the invention, there is provided a hollow component; wherein a plurality of division members (31, 32) of a prospective hollow component (3) are welded with each other through resin (33) filled in the resin path (330) along a periphery of contact parts between the division members (31, 32); and wherein protrusions (316, 326) formed continuously over a whole length of the resin path (330) and the resin (33) filled in the resin path (330) are welded with each other in the resin path (330).

The hollow component according to the ninth aspect of the invention can be formed by the molding method according to the first aspect of the invention, so that a weld structure having portions with a high welding strength continuously along the length of the resin path (330) is obtained. As a result, the overall welding strength and the sealability can be positively secured at the weld parts between the division members (31, 32).

According to a tenth aspect of the invention, there is provided a hollow component, wherein the protrusions (316, 326) are formed over an entire periphery of the resin path (330).

In this aspect of the invention, a weld structure is obtained in which portions having a high welding strength are formed in the longitudinal direction along whole periphery of the resin path (330) and, therefore, the overall welding strength and the sealability can be positively secured at the weld parts between the division members (31, 32).

According to an eleventh aspect of the invention, there is provided a hollow component, wherein the division members (31, 32) have a wall portion (328) erected on an outer peripheral side of weld parts in the resin path (330) between the protrusions (316, 326) and the resin (33) filled in the resin path (330).

In this aspect of the invention, the heat radiation to the mold (A) from the molten resin flowing from the upstream toward the downstream side in the resin path (330) can be suppressed when welding the division members (31, 32) with each other thereby to reduce the temperature drop of the molten resin. Therefore, a stable weld structure can be formed over the whole periphery of the resin path (330). In this way, the overall welding strength and sealability can be more easily secured.

According to a twelfth aspect of the invention, there is provided a hollow component, wherein the welding width W at right angles to the length of the resin path (330) at all the weld parts between the protrusions (316, 326) and the resin (33) filled in the resin path (330) satisfies a relation $W \geq F/(E \times L)$, where F is overall welding strength required of whole weld parts of the hollow component (3), E is strength of the resin forming the division members (31, 32) or strength of the resin (33) filled in the resin path (330), whichever is lower, and L is length of the resin path (330).

In the twelfth aspect of the invention, the hollow component can be formed by the molding method according to the sixth aspect of the invention, and the required overall welding strength and sealability can be positively secured.

According to a thirteenth aspect of the invention, there is provided a hollow component, wherein welding width W at right angles to the length of the resin path (330) at all weld parts between the protrusions (316, 326) and the resin (33) filled in the resin path (330) represents 5 to 100% of the minimum thickness (T) of the plurality of the division members (31, 32).

In the thirteenth aspect of the invention, the hollow component can be formed by the molding method according to the seventh aspect of the invention, and the sealability of the weld parts can be positively secured while at the same time preventing the hollow component (3) from becoming bulky.

The symbols in the brackets attached to each means are examples for showing the correspondence with the specific means described in the later embodiments.

The present invention may be more fully understood from the description of the preferred embodiments of the invention set forth below, together with the accompanying drawings.

DESCRIPTION OF THE PREFERRED EMBODIMENTS

Embodiments of the present invention are described below with reference to the accompanying drawings.

First Embodiment

Figure 1:
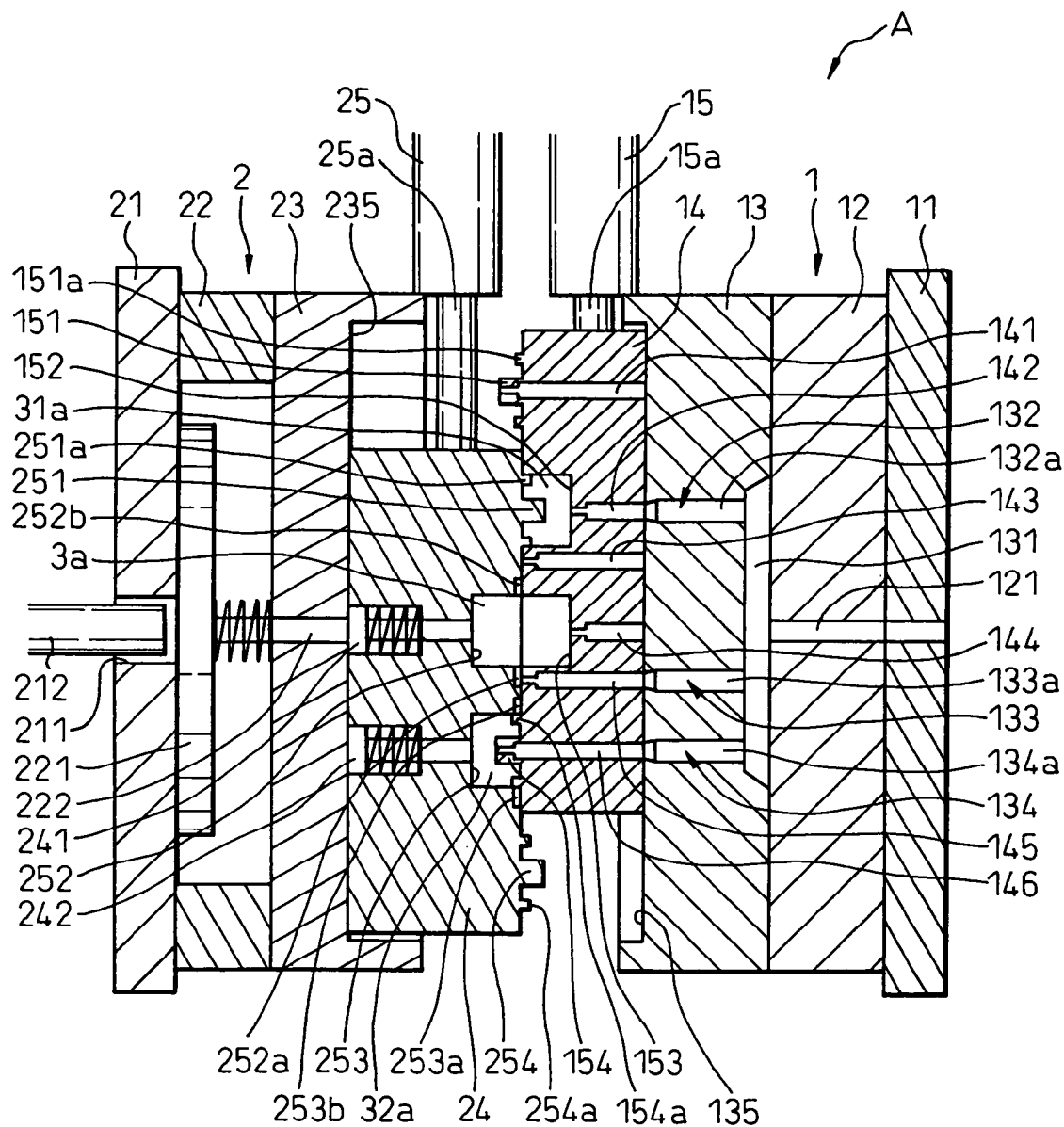
FIG. 1 is a sectional view schematically showing the structure of a mold A used for fabricating a hollow component 3 according to a first embodiment of the present invention.
Figure 2:
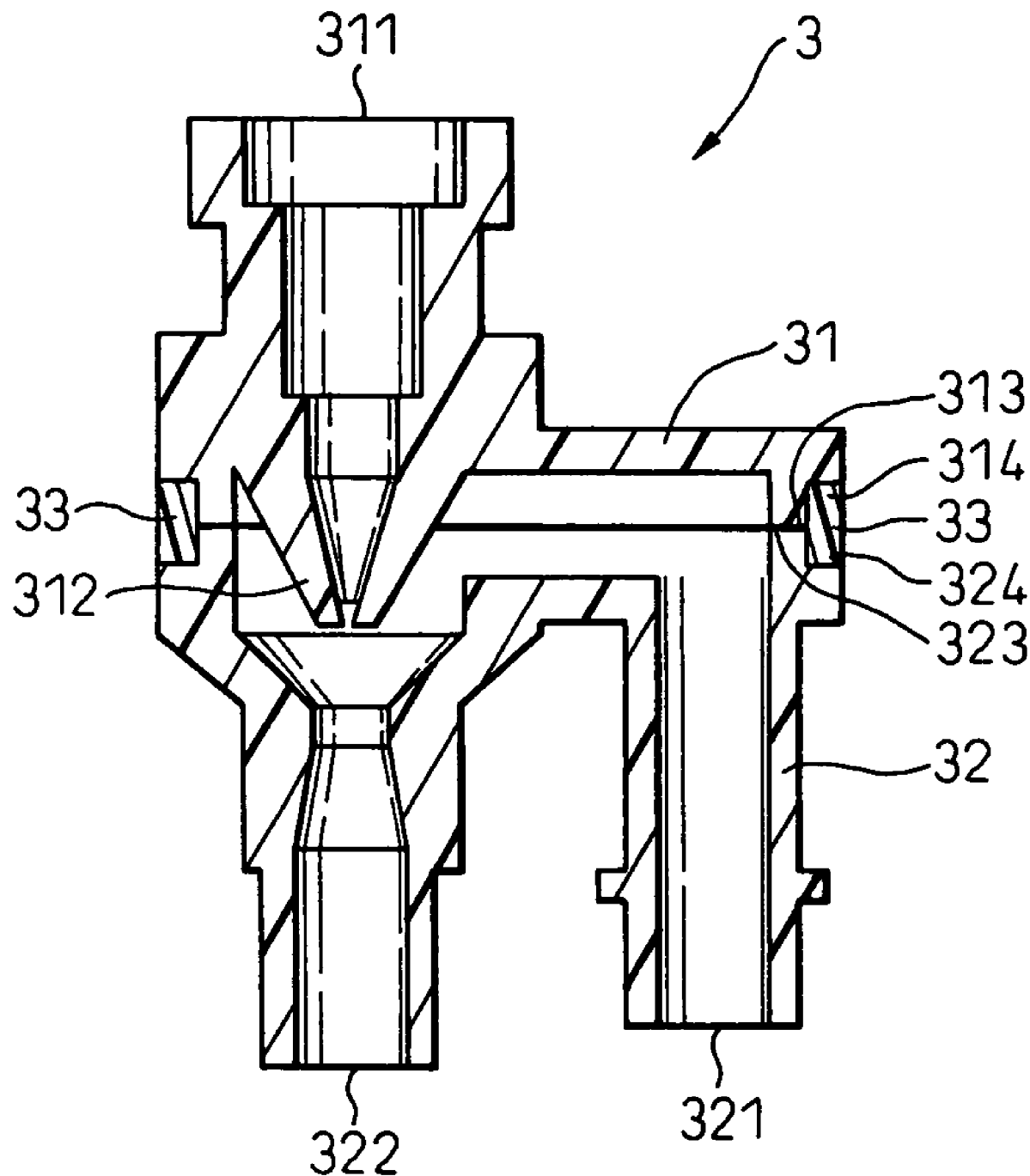
FIG. 2 is a sectional view schematically showing the structure of the hollow component 3.

FIG. 1 is a sectional view schematically showing the structure of a mold A used for fabricating a hollow component 3 according to a first embodiment of the invention. FIG. 2 is a sectional view schematically showing the general structure of the hollow component 3. FIGS. 3 to 12 are sectional views of the mold A in respective molding steps for explaining a method of molding a hollow component.

As shown in FIG. 2, the hollow component 3 according to this embodiment has a hollow structure comprising a plurality of openings. A division member 31 having an opening 311 and a division member 32 having openings 321, 322 are formed by being welded with each other using the peripheral resin 33 filled in grooves 314, 324 (in the peripheral edge path 330 providing a resin path according to this embodiment described later) along the periphery of the contact parts between annular contact surfaces 313, 323. The configuration of these weld parts is described in detail later.

The division member 31 has a nozzle portion 312 projected toward the opening 322 in a hollow space. The space having an opening 311 at an end thereof communicates with a space having openings 321, 322 at both ends thereof through the nozzle portion 312 alone.

The hollow component 3 is arranged in a fuel tank of a vehicle or the like. Part of fuel supplied under pressure from a fuel pump is introduced from the opening 311 and is injected from the nozzle portion 312. Utilizing the negative pressure generated thereby, the fuel sucked from the opening 321 is discharged from the opening 322. The hollow component 3 which operates in the manner described above is used as a pump (an aspirator) for transferring fuel in a fuel tank.

As shown in FIG. 1, the mold A comprises a fixed die 1 and a movable die 2. In FIG. 1, the mold A is shown schematically and the parts corresponding to the openings of the hollow component 3, etc. are not shown.

The fixed die 1 comprises main parts including a fixed disk 11, a runner plate 12, a guide plate 13, a slide die 14 and a pneumatic cylinder 15. The fixed disk 11 for mounting the fixed die 1 on a fixed platen of an injection molding machine not shown and the runner plate 12 juxtaposed with the fixed disk 11 are formed with a primary sprue 121 for introducing a molten resin injected from a nozzle portion of the injection molding machine not shown.

The guide plate 13 juxtaposed with the side surface of the runner plate 12 far from the fixed disk 11 is formed with upstream portions 132a, 133a, 134a of secondary sprues 132, 133, 134, respectively, for supplying the molten resin to cavities 3a, 31a, 32a described later. A runner 131 is interposed extensively between the runner plate 12 and the guide plate 13, so that the downstream end of the primary sprue 121 communicates with the upstream ends of the upstream portions 132a, 133a, 134a of the secondary sprues 132, 133, 134, respectively.

The side surface of the guide plate 13 far from the runner plate 12 is formed with a depression 135. A slide die is arranged in the depression 135 movably vertically in the drawing. The slide die 14 is coupled to a rod 15a of a pneumatic cylinder 15 fixed on the guide plate 13.

The slide die 14, while being closely attached in the depression 135 of the guide plate 13, is adapted to slide between a lower position where the rod 15a of the pneumatic cylinder 15 is extended most and an upper position where the rod 15a of the pneumatic cylinder 15 is most contracted.

The movable die 2 comprises main parts including a movable disk 21, an intermediate member 22, a guide plate 23, a slide die 24 and a pneumatic cylinder 25. The movable disk 21 for mounting the movable die 2 on a movable platen (not shown) movable back and forth with respect to a fixed platen is formed with an opening 211 through which the ejector 212 of the injection molding machine is adapted to be loosely inserted.

The movable disk 21 is arranged in juxtaposition with the intermediate member 22, and a side surface of the intermediate member 22 far from the movable disk 21 is juxtaposed with the guide plate 23. An ejector plate 221 and an ejector pin 222 for transmitting the projection force of the ejector 212 and projecting the ejector pins 241, 242 built in a slide die 24 described later are arranged in a space surrounded by the movable disk 21, the intermediate member 22 and the guide plate 23.

A side surface of the guide plate 23 far from the intermediate member 22 is formed with a depression 235. The slide die 24 is arranged in the depression 235 movably vertically in the drawing. The slide die 24 is connected with a rod 25a of a pneumatic cylinder 25 fixed on the guide plate 23.

The slide die 24, while being closely attached in the depression 235 of the guide plate 23, is adapted to slide between a lower position where the rod 25a of the pneumatic cylinder 25 is extended most and an upper position where the rod 25a of the pneumatic cylinder 25 is most contracted.

The die matching surface between the slide die 14 and the movable die 2 is formed with, from the top down, a male die 151, a female die 152, a female die 153 and a male die 154 in that order. In the slide die 14, downstream portions 141, 142, 143, 144, 145 and 146, making up the downstream side portions of the secondary sprues 132, 133 and 134, are formed, from the top down in that order.

A die matching surface between the slide die 24 and the fixed die 1, on the other hand, is formed with, from the top down, a male die 251, a female die 252, a female die 253 and a male die 254 in that order. Also, the ejector pins 241, 242, which are adapted to project into the female dies 252, 253 when depressed from the left side in the drawing are built in the slide die 24, leftward of the female dies 252, 253 in the drawing, respectively.

In the case where the mold is clamped (closed to form a cavity therein) in the state shown in FIG. 1 with the slide die 14 at the upper position and the slide die 24 at the lower position, the state described below is developed.

The female die 152 is combined with the male die 251, and the cavity 31a similar in shape to the division member 31 is formed between the female die 152 and the male die 251, so that the cavity 31a communicates with the upstream portion 132a through the downstream portion 142. Specifically, the upstream portion 132a and the downstream portion 142 form the secondary sprue 132 for supplying the molten resin to the cavity 31a.

Also, the male die 154 is combined with the female die 253, and the cavity 32a, similar in shape to the division member 32, is formed between the male die 154 and the female die 253, so that the cavity 32a communicates with the upstream portion 134a through the downstream portion 146. Specifically, the upstream portion 134a and the downstream portion 146 form the secondary sprue 134 for supplying the molten resin to the cavity 32a.

Further, the female die 153 is combined with the female die 252, and the cavity (product portion) 3a similar in the shape corresponding to the contour of the hollow component 3 is formed between the female die 153 and the female die 252, so that the cavity 3a communicates with the upstream portion 133a through the downstream portion 145. Specifically, the upstream portion 133a and the downstream portion 145 form the secondary sprue 133 for supplying the molten resin to the cavity 3a.

The female die 252 has a lead-in path 252a and an overflow path 252b communicating therewith, while the female die 253 has a lead-in path 253a and an overflow path 253b communicating therewith. The cavity 3a and the secondary sprue 133 communicate with each other through the lead-in path 252a.

Also, the peripheral edge portion of the male dies 151, 154 is formed with annular protrusions 151a, 154a adapted to fit on the peripheral edge portions of the female dies 252, 253, respectively, and having the same shape as the shape of the groove 324 of the division member 32. In similar fashion, the peripheral edge portion of the male dies 251, 254 is formed with annular protrusions 251a, 254a, respectively, adapted to fit on the peripheral edge portions of the female dies 152, 153 and having the same shape as the shape of the groove 314 of the division member 31. The cavity 32a is cut off from the lead-in path 253a and the overflow path 253b by the protrusions 154a.

In the case where the mold is clamped with the slide die 14 at the lower position and the slide die 24 at the upper position, on the other hand, the state described below is developed.

The female die 153 is combined with the male die 254, and the cavity 31a similar in shape to the division member 31 is formed between the female die 153 and the male die 254, so that the cavity 31a communicates with the upstream portion 134a through the downstream portion 144. Specifically, the upstream portion 134a and the downstream portion 144 form the secondary sprue 134 for supplying the molten resin to the cavity 31a.

Also, the male die 151 is combined with the female die 252, and the cavity 32a similar in shape to the division member 32 is formed between the male die 151 and the female die 252, so that the cavity 32a communicates with the upstream portion 132a through the downstream portion 141. Specifically, the upstream portion 132a and the downstream portion 141 form the secondary sprue 132 for supplying the molten resin to the cavity 32a.

Further, the female die 152 is combined with the female die 253, and the cavity (product portion) 3a in the shape corresponding to the contour of the hollow component 3 is formed between the female die 152 and the female die 253, so that the cavity 3a communicates with the upstream portion 133a through the downstream portion 143. Specifically, the upstream portion 133a and the downstream portion 143 form the secondary sprue 133 for supplying the molten resin to the cavity 3a.

Incidentally, the cavity 3a communicates with the secondary sprue 133 through the lead-in path 253a. Also, the cavity 32a is cut off from the lead-in path 252a and the overflow path 252b by the protrusions 151a.

Next, the method of molding the hollow component 3 using the mold A having the aforementioned configuration is explained.

Figure 3:
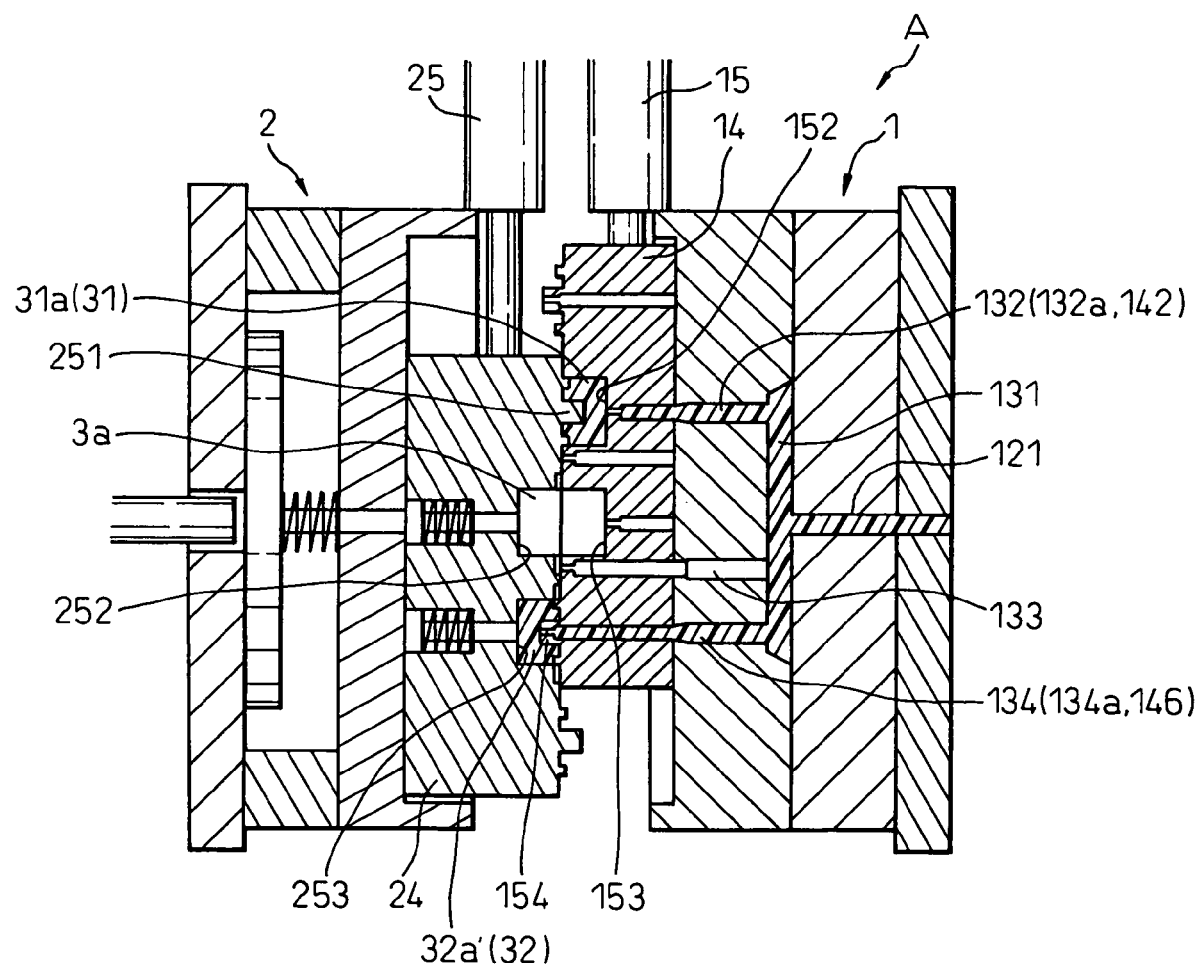
FIG. 3 is a sectional view of the mold A for explaining the method of molding a hollow component.

In fabricating the hollow component 3, as shown in FIG. 3, the pneumatic cylinders 15, 25 are activated, first of all, to thereby clamp the mold with the slide die 14 at the upper position and the slide die 24 at the lower position. In this way, a nozzle portion of the injection molding machine not shown is brought into contact with the upstream end of the primary sprue 121 thereby to inject the molten liquid resin (polyacetal resin of about 200° C. in this embodiment).

As a result, the molten resin is filled in the cavity 31a between the female die 152 and the male die 251 and the cavity 32a between the male die 154 and the female die 253 through the primary sprue 121, the runner 131, the secondary sprue 132 including the upstream portion 132a and the downstream portion 142 and the secondary sprue 134 including the upstream portion 134a and the downstream portion 146.

In the process, the path of the runner 131 connected to the secondary sprue 133 is cut off by activating a runner cut mechanism not shown thereby to prevent the molten resin from being supplied into the cavity 3a formed of the female die 153 and the female die 252. In this way, the division members 31, 32 of the hollow component 3 are molded in the cavities 31a, 32a, respectively.

Figure 4:
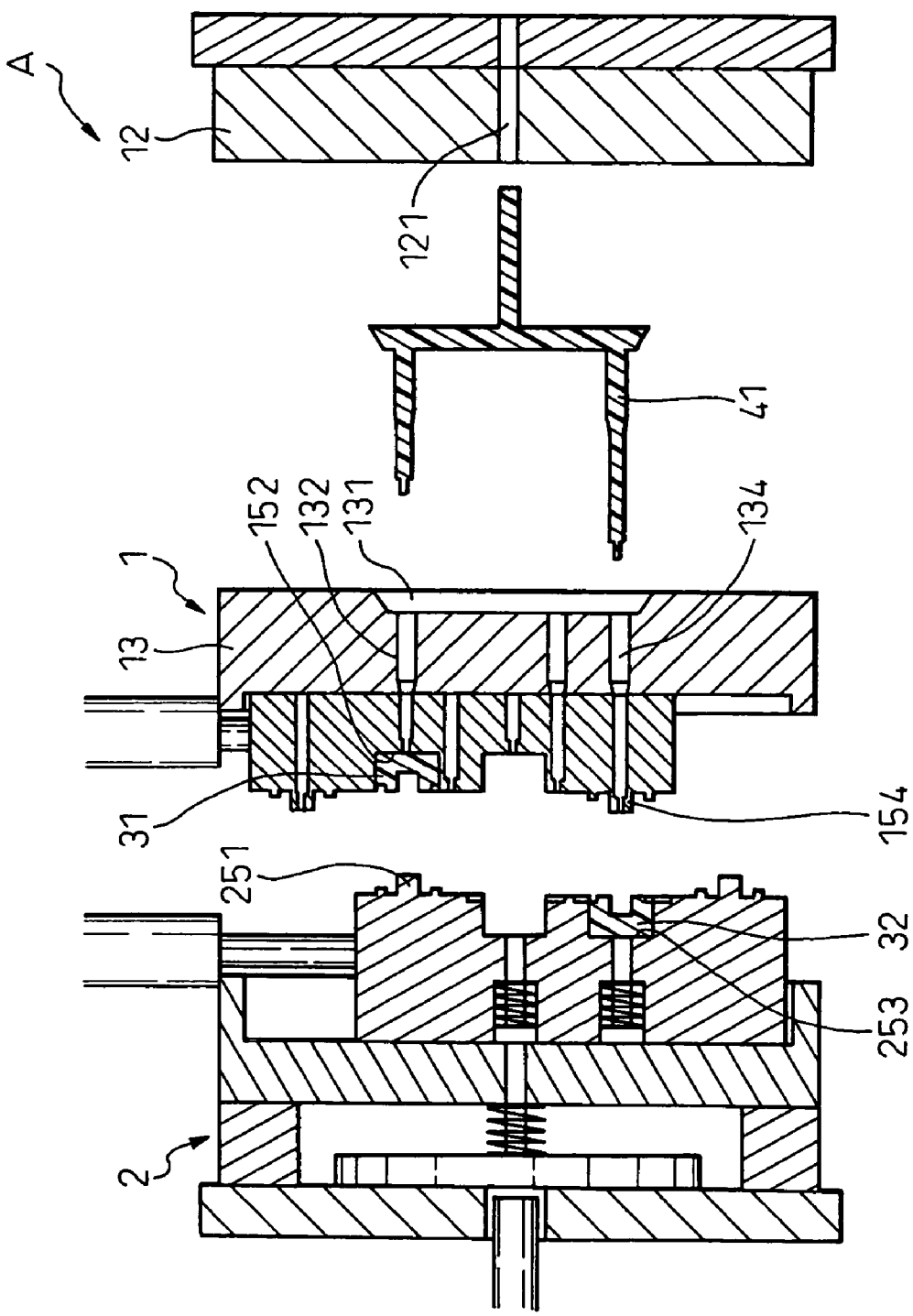
FIG. 4 is a sectional view of the mold A for explaining the method of molding a hollow component.

After the division members 31, 32 are cooled and solidified, as shown in FIG. 4, the fixed die 1 and the movable die 2 are opened, while at the same time separating the runner plate 12 and the guide plate 13 of the fixed die 1 from each other. By doing so, the female dies 251, 154 are released from the division members 31, 32, so that the division members 31, 32 are left in the female dies 152, 253, respectively. At the same time, the resin sprue runner 41 solidified in the primary sprue 121, the runner 131 and the secondary sprues 132, 134 is removed from the fixed die 1.

Figure 5:
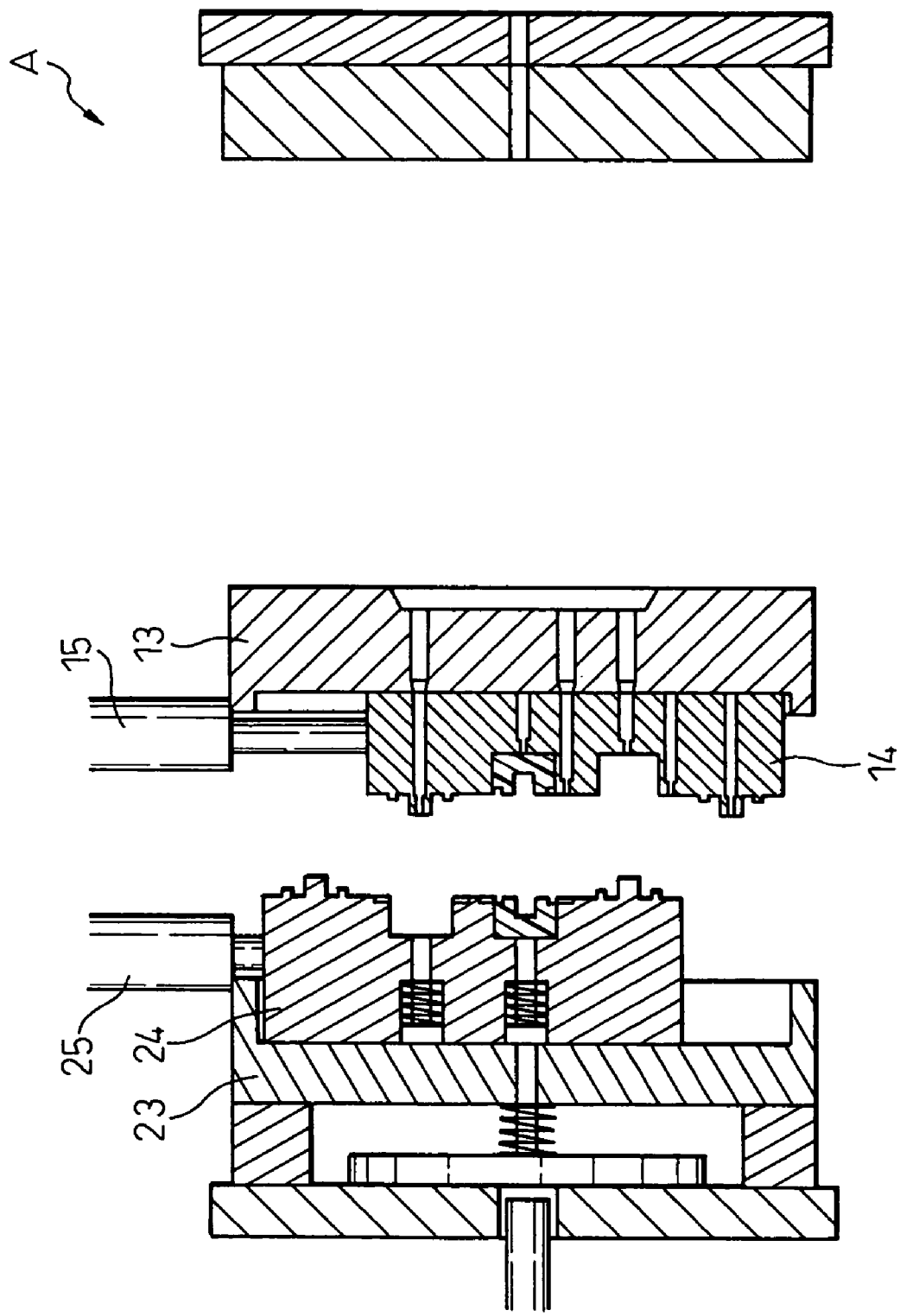
FIG. 5 is a sectional view of the mold A for explaining the method of molding a hollow component.
Figure 6:
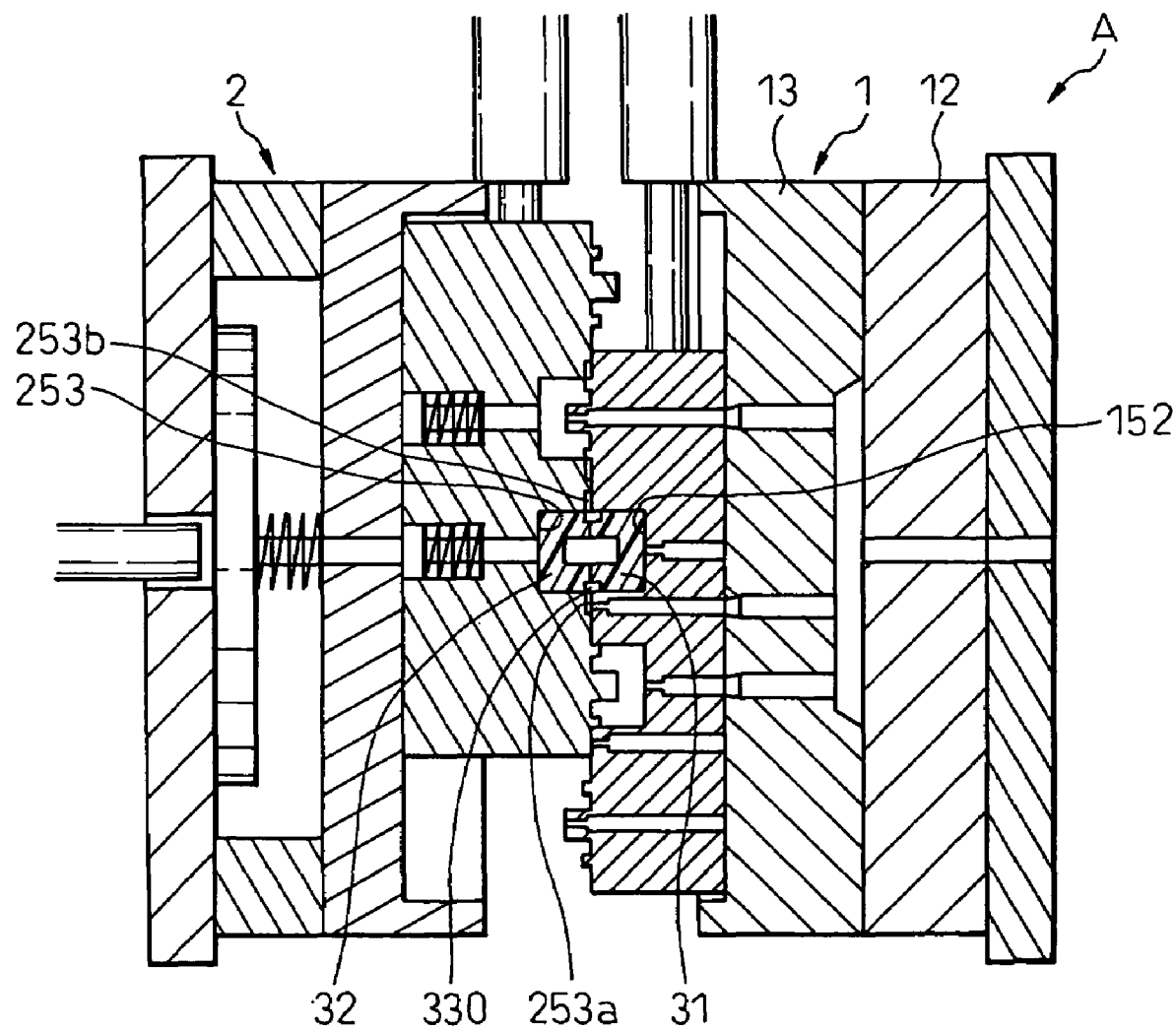
FIG. 6 is a sectional view of the mold A for explaining the method of molding a hollow component.

Next, as shown in FIG. 5, the pneumatic cylinders 15, 25 are activated thereby to slide the slide die 14 to the lower position and the slide die 24 to the upper position. After that, as shown in FIG. 6, the runner plate 12 and the guide plate 13 are coupled with each other, while at the same time clamping the fixed die 1 and the movable die 2.

As a result, the division members 31, 32 left in the female dies 152, 253 are brought into a state in which the contact surfaces 313, 323 (FIG. 2), respectively, come into contact with each other. Further, the peripheral edge of the contact parts is formed with a peripheral edge flow path 330 through which resin passes and which communicates with the lead-in path 253a and the overflow path 253b by the grooves 314, 324 (FIG. 2).

Figure 7:
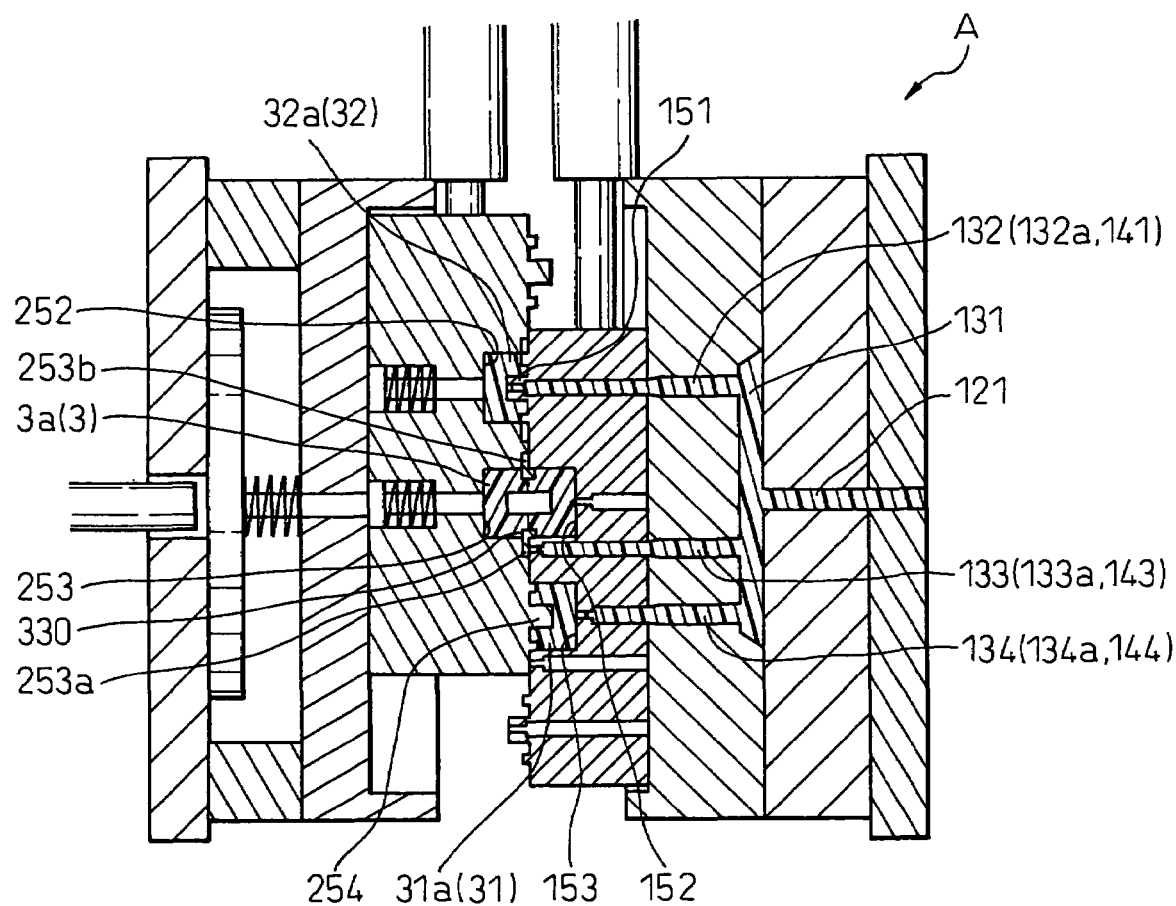
FIG. 7 is a sectional view of the mold A for explaining the method of molding a hollow component.

After clamping the mold in this way, as shown in FIG. 7, the nozzle portion of the injection molding machine not shown is brought into contact with the upstream end portion of the primary sprue 121 and the molten liquid resin (polyacetal resin of about 200° C. in this embodiment as in the first injection) is injected.

As a result, the molten resin is filled in the cavity 32a between the male die 151 and the female die 252, the cavity 3a between the female die 152 and the female die 253 and the cavity 31a between the female die 153 and the male die 254, through the primary sprue 121, the runner 131, the secondary sprue 132 including the upstream portion 132a and the downstream portion 141, the secondary sprue 133 including the upstream portion 133a and the downstream portion 143 and the secondary sprue 134 including the upstream portion 134a and the downstream portion 144.

In the process, the aforementioned runner cut mechanism, not shown, establishes the communication of a path connecting to the secondary sprue 133.

The molten resin flowing through the secondary sprue 133 is introduced into the cavity 3a from the lead-in path 253a, and is filled up to the overflow path 253a from the peripheral edge path 330 formed in the cavity 3a. In the peripheral edge path 330, the heat of the molten resin melts the internal resin surface of the grooves 314, 324 (FIG. 2) of the division members 31, 32, which are then cooled into solid state thereby to weld the division members 31 and 32 with each other.

The process of filling the resin into the cavity 3a is described in detail later.

In this way, the hollow component 3 is formed in the cavity 3a, on the one hand, and the division members 31, 32 of the hollow component 3 are molded in the cavities 31a, 32a, at the same time.

Figure 8:
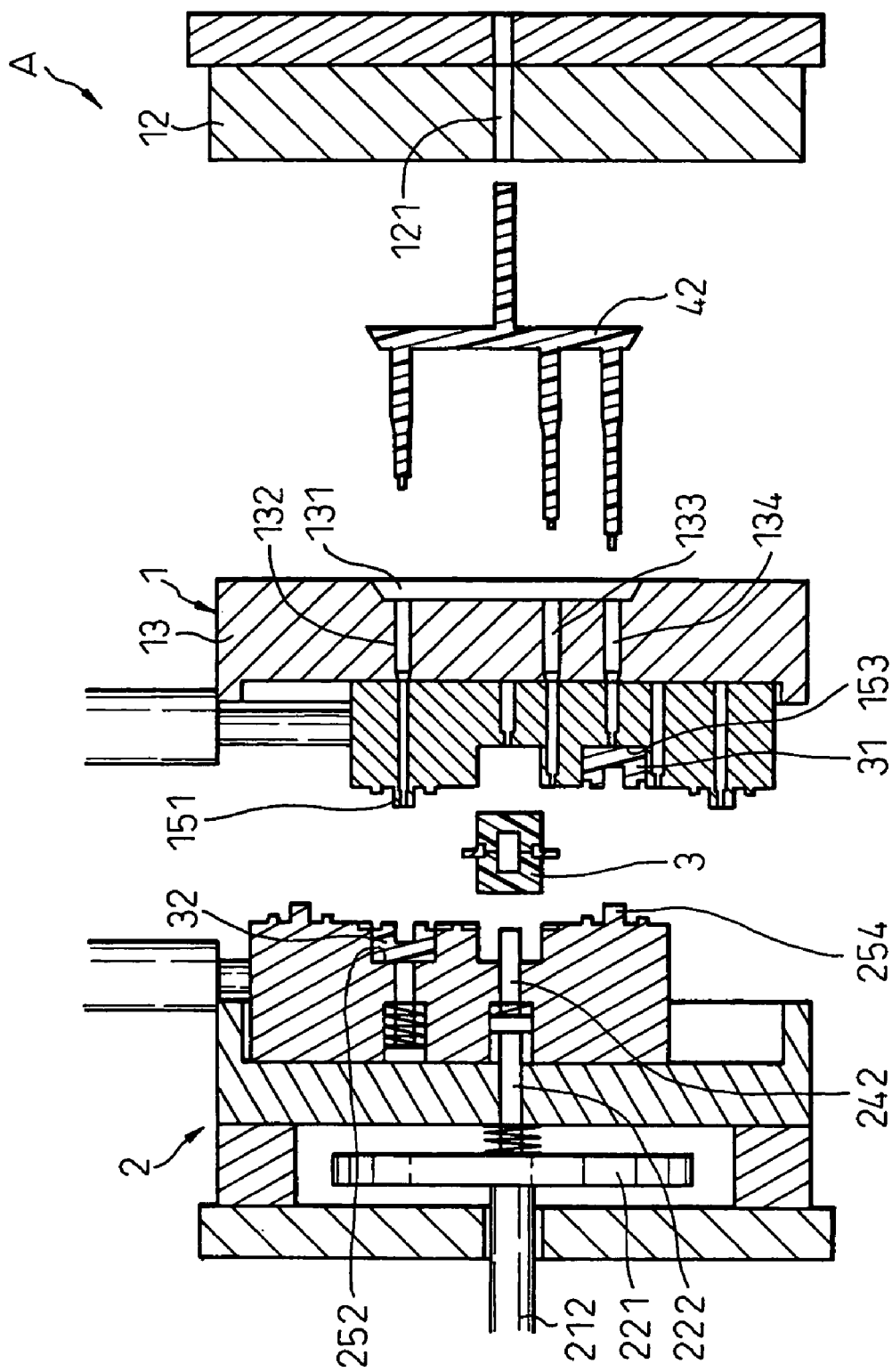
FIG. 8 is a sectional view of the mold A for explaining the method of molding a hollow component.

Once the peripheral edge portion of the contact parts of the hollow component 3 and the division members 31, 32 are cooled into solid state, as shown in FIG. 8, the fixed die 1 and the movable die 2 are opened thereby to separate the runner plate 12 and the guide plate 13 of the fixed die 1 from each other. The ejector 212 is advanced rightward in the drawing, and the ejector pin 242 is projected through the ejector plate 221 and the ejector pin 222 thereby to remove the hollow component 3 from the mold.

Also, the male dies 254, 151 are separated from the division members 31, 32, which are thus left in the female dies 153, 252, respectively. At the same time, the resin sprue runner 42 solidified in the primary sprue 121, the runner 131 and the secondary sprues 132, 133, 134 is removed from the inside of the fixed die 1.

Figure 9:
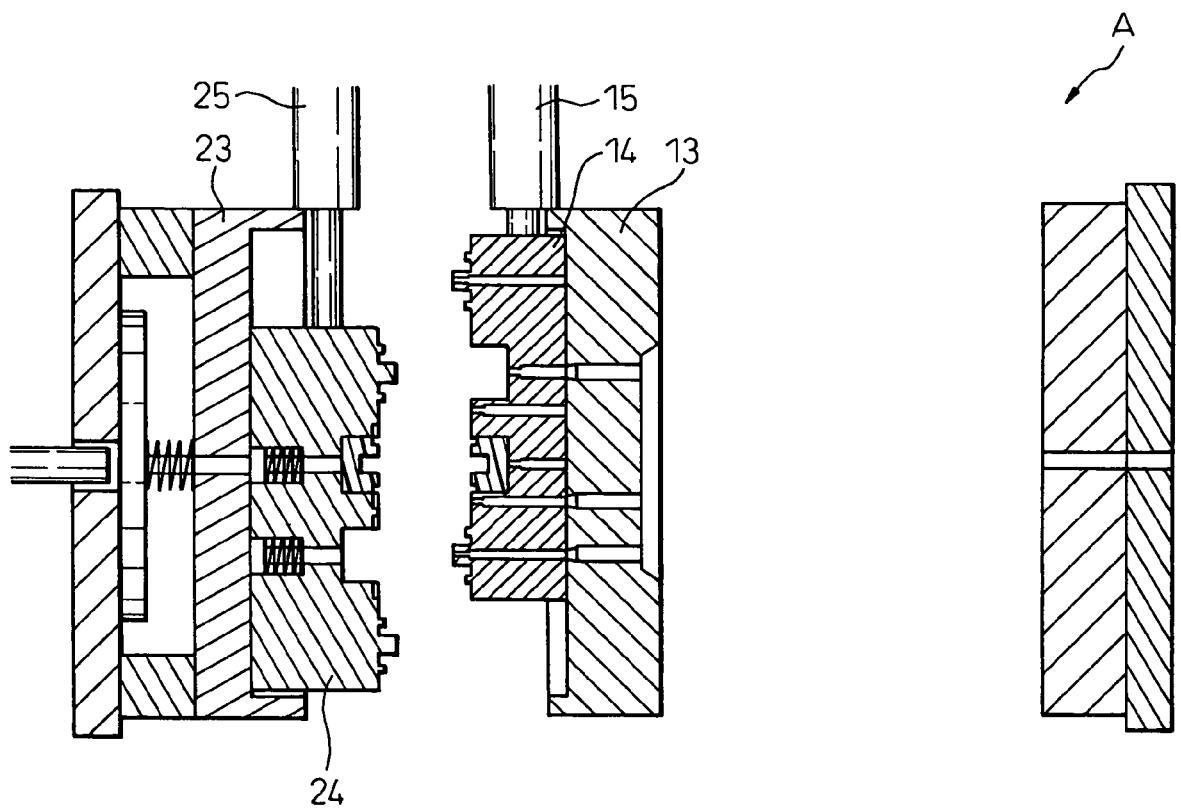
FIG. 9 is a sectional view of the mold A for explaining the method of molding a hollow component.
Figure 10:
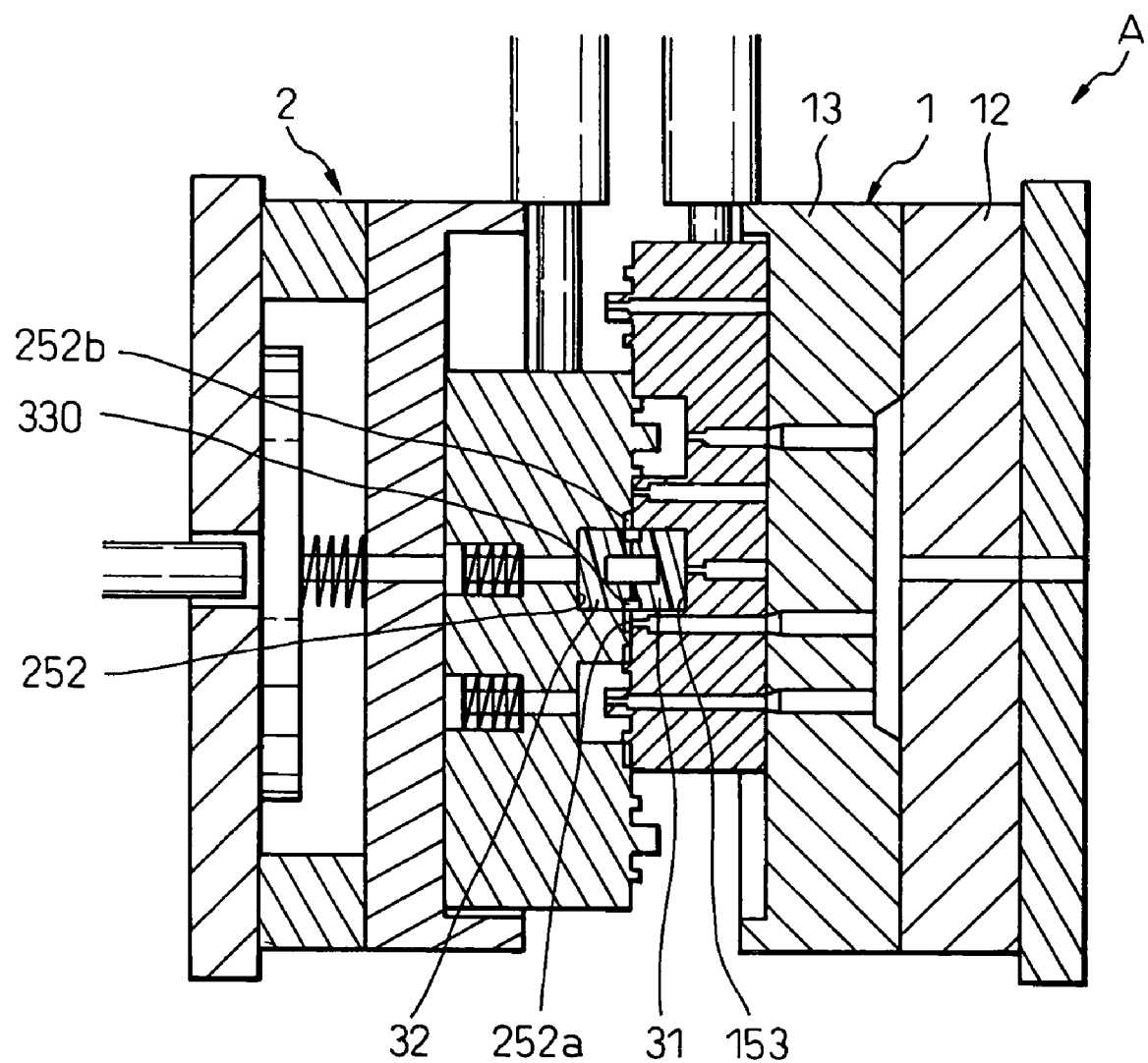
FIG. 10 is a sectional view of the mold A for explaining the method of molding a hollow component.

Next, as shown in FIG. 9, the pneumatic cylinders 15, 25 are activated, so that the slide die 14 is slid to the upper position and the slide die 24 to the lower position. After that, as shown in FIG. 10, the runner plate 12 and the guide plate 13 are coupled with each other while, at the same time, clamping the fixed die 1 and the movable die 2.

As a result, the division members 31, 32 left in the female dies 153, 252 are brought into a state in which the contact parts 313, 323 thereof (FIG. 2) come into contact with each other. Further, the peripheral edge of the contact parts is formed with the peripheral edge path 330 through which resin passes and which communicates with the lead-in path 252a and the overflow path 252b, by the grooves 314, 324 (FIG. 2).

Figure 11:
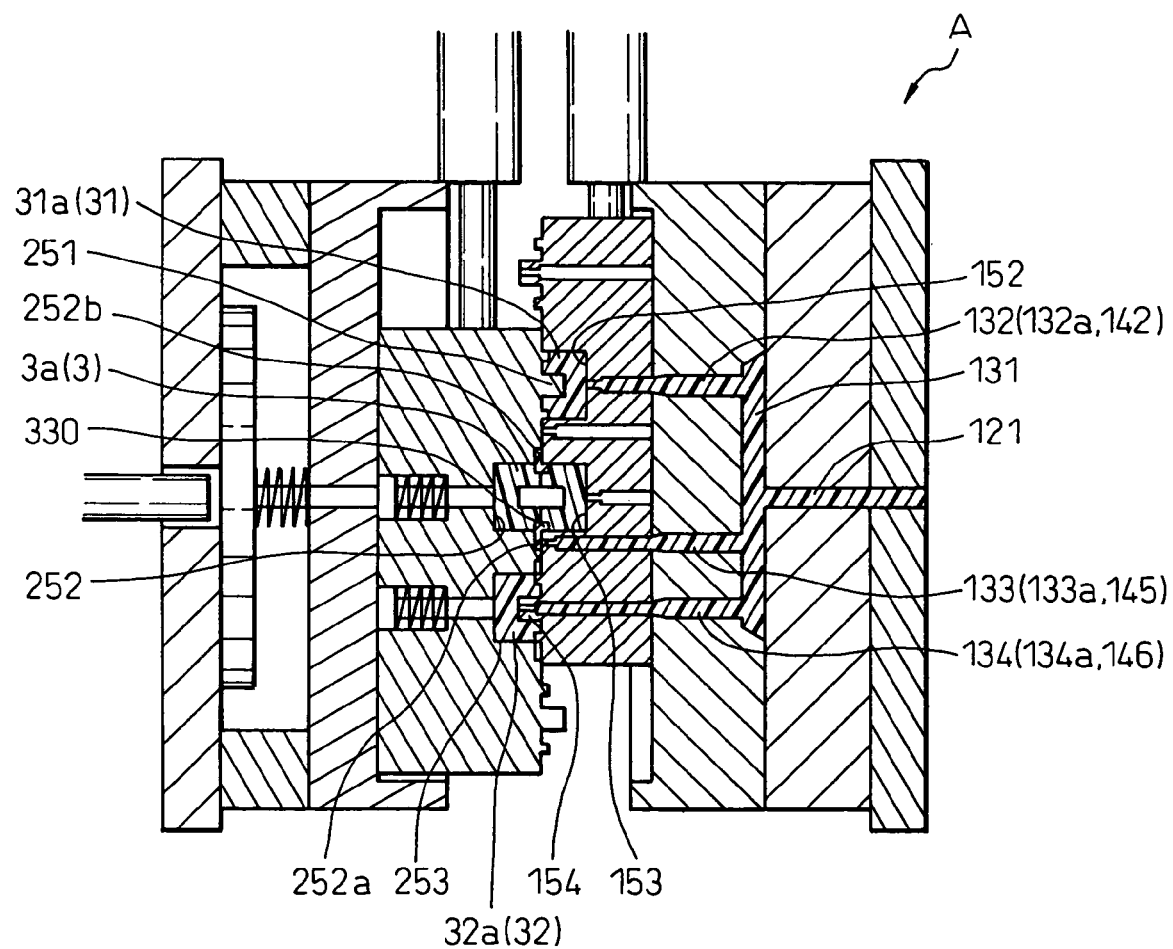
FIG. 11 is a sectional view of the mold A for explaining the method of molding a hollow component.

After clamping the mold in this way, as shown in FIG. 11, the nozzle portion of the injection molding machine not shown is brought into contact with the upstream end portion of the primary sprue 121, and the molten liquid resin (polyacetal resin of about 200° C. in this embodiment as in the first and second injections) is injected.

As a result, the molten resin is filled in the cavity 31a between the female die 152 and the male die 251, the cavity 3a between the female die 153 and the female die 252 and the cavity 32a between the male die 154 and the female die 253, through the primary sprue 121, the runner 131, the secondary sprue 132 including the upstream portion 132a and the downstream portion 142, the secondary sprue 133 including the upstream portion 133a and the downstream portion 145 and the secondary sprue 134 including the upstream portion 134a and the downstream portion 146.

In the process, as in the step shown in FIG. 7, the aforementioned runner cut mechanism, not shown, establishes communication through a path connecting to the secondary sprue 133.

The molten resin flowing through the secondary sprue 133 is introduced into the cavity 3a through the lead-in path 252a, and is filled up to the overflow path 252b from the peripheral edge path 330 formed in the cavity 3a. In the peripheral edge path 330, the heat of the molten resin melts the internal resin surface of the grooves 314, 324 (FIG. 2) of the division members 31, 32, which are then cooled into a solid state thereby to weld the division members 31 and 32 with each other.

In this way, the hollow component 3 is formed in the cavity 3a, on the one hand, and the division members 31, 32 of the hollow component 3 are molded in the cavities 31a, 32a, respectively, at the same time.

Figure 12:
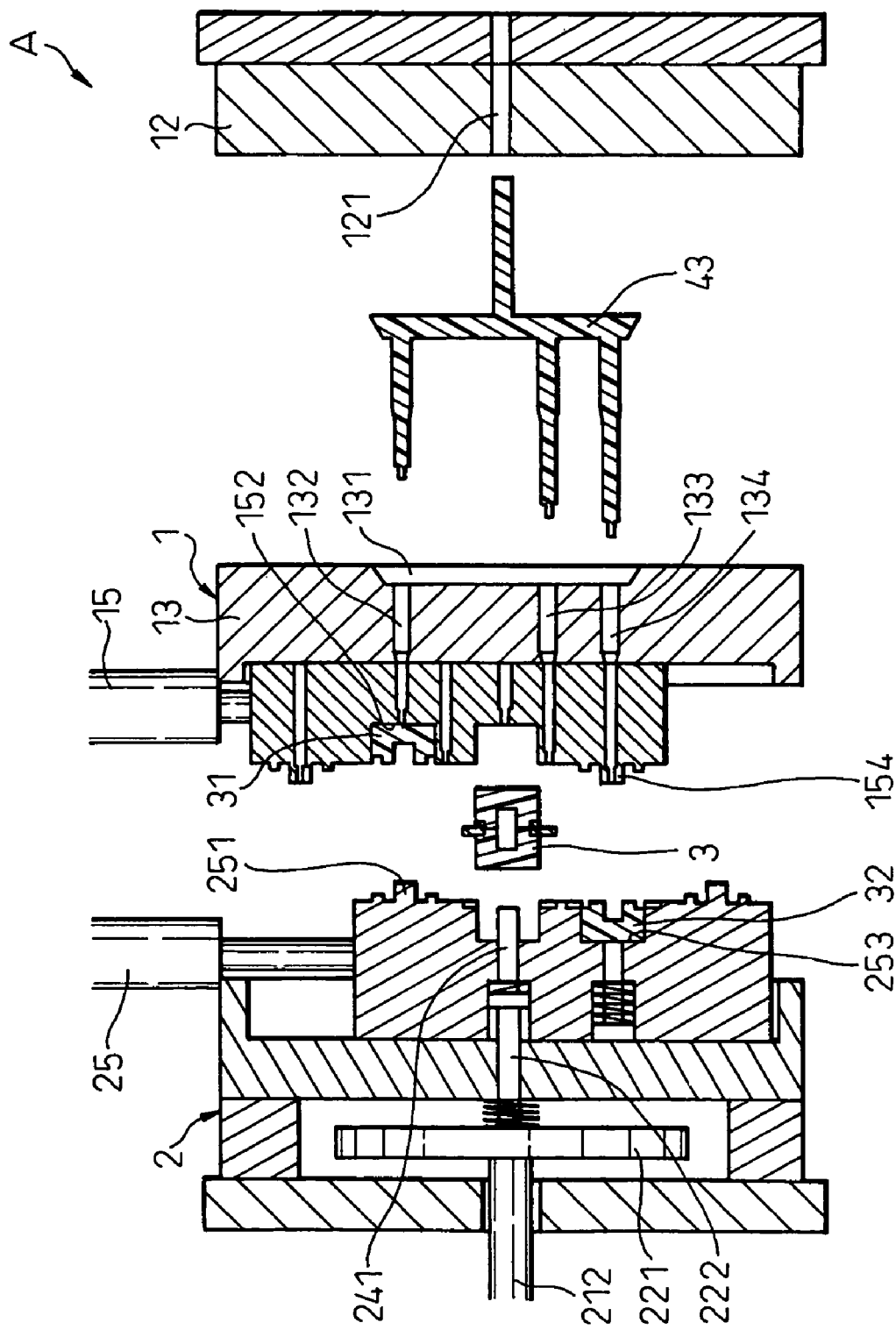
FIG. 12 is a sectional view of the mold A for explaining the method of molding a hollow component.

Once the peripheral edge portion of the contact part of the hollow component 3 and the division members 31, 32 are cooled into solid state, as shown in FIG. 12, the fixed die 1 and the movable die 2 are opened thereby to separate the runner plate 12 and the guide plate 13 of the fixed die 1 from each other. The ejector 212 is advanced rightward in the drawing, and the ejector pin 241 is projected through the ejector plate 221 and the ejector pin 222 thereby to separate the hollow component 3 from the mold.

Also, the male dies 251, 154 are separated from the division members 31, 32, which in turn are left in the female dies 152, 253, respectively. At the same time, the resin sprue runner 43 solidified in the primary sprue 121, the runner 131 and the secondary sprues 132, 133, 134 is removed from the inside of the fixed die 1.

Next, the pneumatic cylinders 15, 25 are activated, so that the slide die 14 is slid to the lower position and the slide die 24 to the upper position. This is the process shown in FIG. 5 and, by repeating the steps shown in FIGS. 5 to 12, the hollow components 3 can be molded in succession.

In the steps shown in FIGS. 5 to 12, the process (called the primary molding process) of molding the division members 31, 32 and the process (called the secondary molding process) of forming the hollow component 3 by filling and solidifying the resin (peripheral resin 33 shown in FIG. 2) in the peripheral edge path 330, are carried out at the same time. Therefore, the hollow component 3 can be produced each time the fixed die 1 and the movable die 2 are opened.

The process of molding the division members 31, 32 in FIGS. 3, 7 and 11 is the molding process according to this embodiment. The process shown in FIGS. 6 and 10, on the other hand, is the flow path forming process for forming a resin path along the peripheral edge of the contact parts of the division members 31, 32 according to this embodiment. Also, in FIGS. 7 and 11, the step of filling the molten resin in the resin path along the peripheral edge of the contact parts and the step of welding the division members 31, 32 with each other by cooling the filled molten resin into solid state are included in the welding process according to this embodiment.

Next, the resin flow path structure and the weld structure for the secondary molding process representing the essential parts of the present invention are explained.

Figure 13:
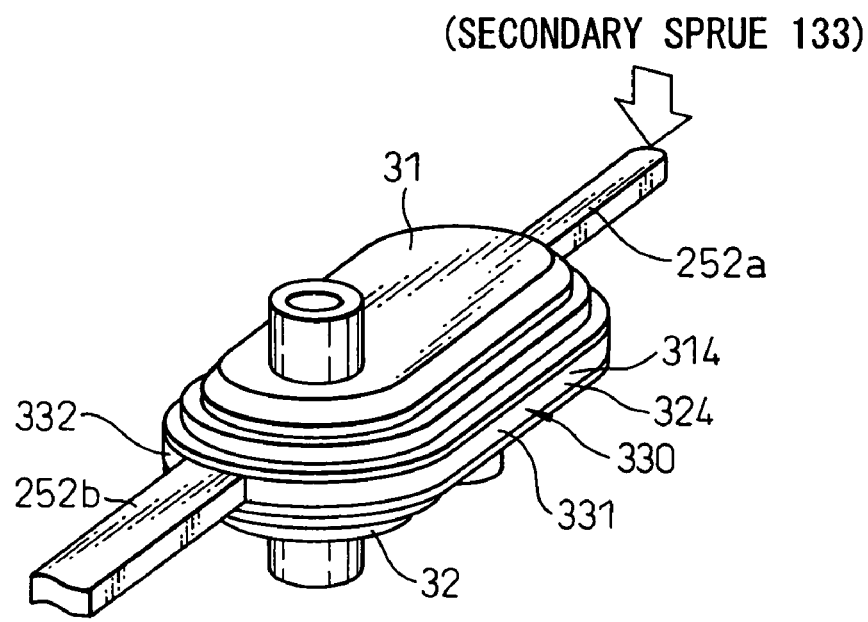
FIG. 13 is a perspective view showing division members and a resin path.
Figure 14:
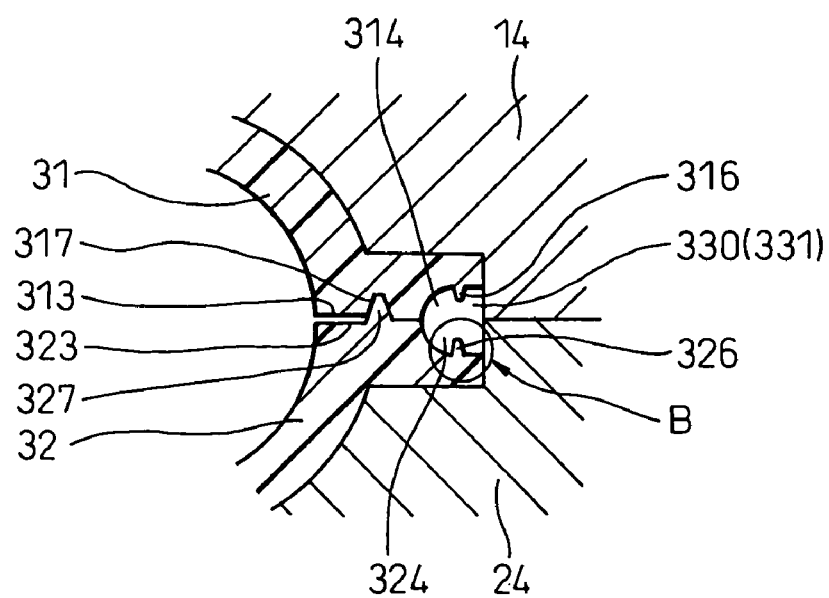
FIG. 14 is a sectional view of essential parts showing a structure of a peripheral edge path 330 formed in a flow path forming step.
Figure 15:
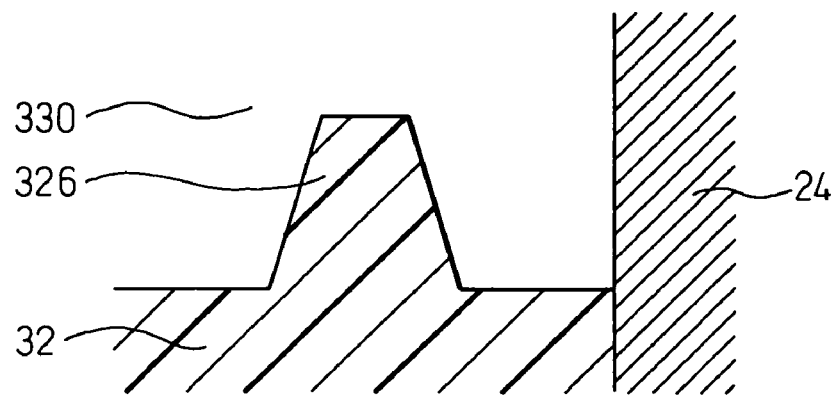
FIG. 15 is an enlarged view of the section B in FIG. 14.
Figure 16:
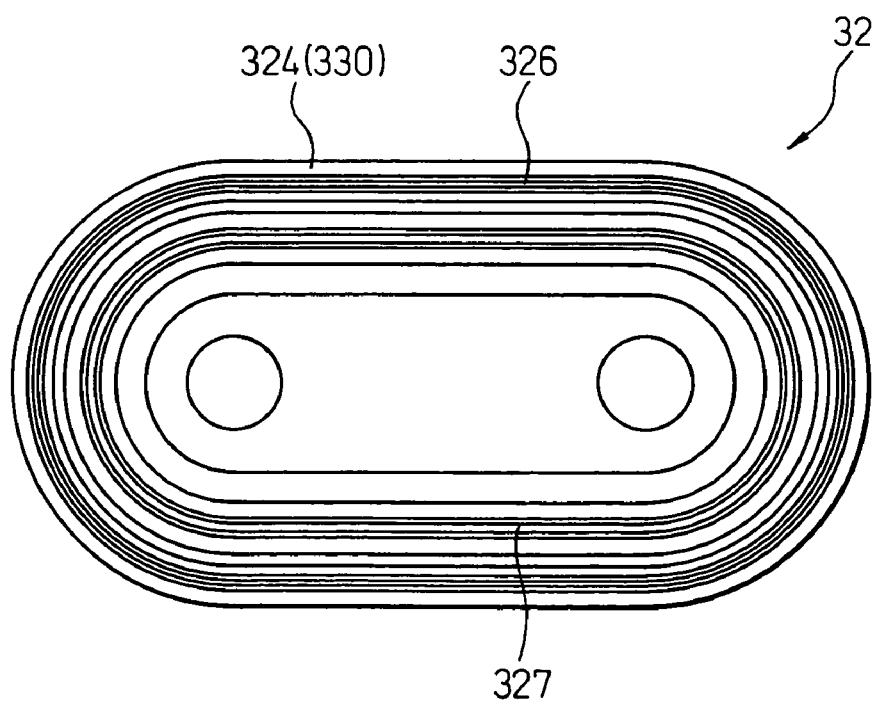
FIG. 16 is a plan view of the division member 32.

FIG. 13 is a perspective view showing the division members 31, 32, the peripheral edge path 330 formed along the peripheral edge of the contact parts of the division members 31, 32 in the flow path forming step, a lead-in path communicating with the flow path 330 and an overflow path. FIG. 14 is a sectional view of the essential parts representing the structure of the peripheral edge path 330, and FIG. 15 is an enlarged view of the section B in FIG. 14. FIG. 16 is a plan view of the division member 32.

Figure 17:
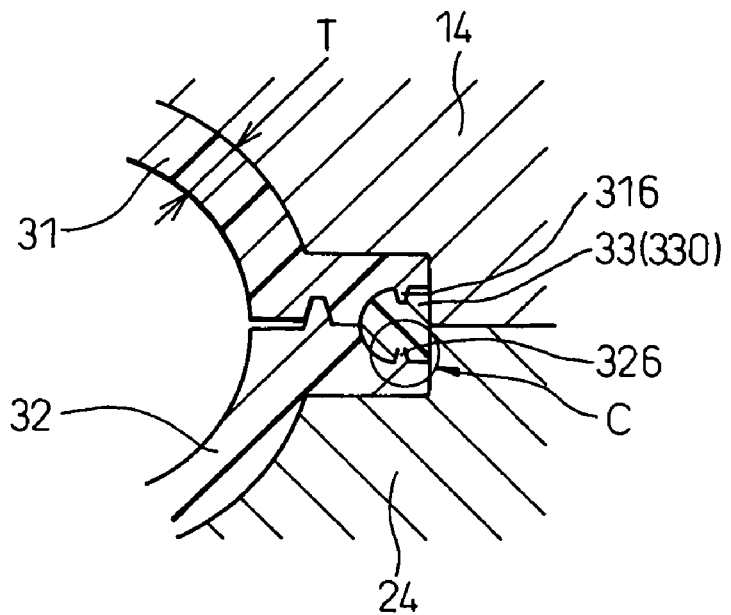
FIG. 17 is a sectional view of the essential parts of a weld part between the division members 31, 32 welded in a welding step.
Figure 18:
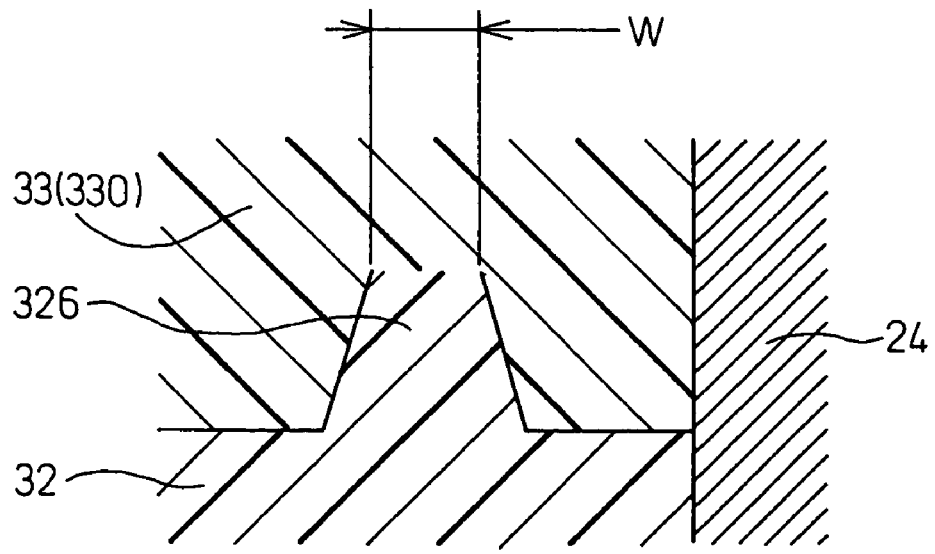
FIG. 18 is an enlarged view of the section C in FIG. 17.

FIG. 17 is a sectional view showing the essential parts of the weld parts of the division members 31, 32 welded with each other in the welding step, and FIG. 18 is an enlarged view of the section C in FIG. 17.

In the aforementioned method of forming the hollow component 3, the peripheral edge path 330 is formed along the peripheral edge of the contact parts of the division members 31, 32 in the steps shown in FIGS. 6 and 10, and the welding process (secondary molding process) is carried out in the steps shown in FIGS. 7 and 11. As the process is the same for both cases, however, the resin path formed in the step shown in FIG. 10 and the welding process shown in FIG. 11 are explained below.

As shown in FIG. 10, in the case where the female dies 153, 252, in which the division members 31, 32 are left, are combined with each other, as shown in FIG. 13, the peripheral edge path 330 constituting a resin path filled with the molten resin in the secondary molding process (welding process) is formed. Incidentally, the division members are shown schematically in FIGS. 13, 14, 16 and 17.

The lead-in path 252a has an end connected to the downstream end of the secondary sprue 133, and the other end connected to the peripheral edge path 330 formed of the groove 314 of the division member 31 and the groove 324 of the division member 32. The peripheral edge path 330 branches in two directions downstream of the junction with the lead-in path 252a, and includes a peripheral edge path 331 on this (the near) side of the page and a peripheral edge path 332 on the far side of the page. The overflow path 252b is connected to confluence between the peripheral edge path 331 and the peripheral edge path 332.

Specifically, a resin flow path branches at the junction point between the lead-in path 252a and the peripheral edge paths 331, 332, while resin flow paths merge with each other at the junction point between the peripheral edge paths 331, 332 and the overflow path 252b. According to this embodiment, the sectional area of lead-in path 252a and the peripheral edge paths 331, 332 is 4 mm$^2$, and that of the overflow path 252b is 8 mm$^2$. The total sectional area of the peripheral edge paths 331, 332, therefore, is larger than the sectional area of the lead-in path 252a. Also, the sectional area of the overflow path 252b is equal to the total sectional area of the peripheral edge paths 331, 332.

FIG. 14 shows a sectional structure as viewed at right angles to the longitudinal direction of the peripheral edge path 330 (in the direction of the molten resin flow in the welding step). As shown in this diagram, the peripheral edge path 330 (the peripheral edge path 331 in the case under consideration) is formed in such a manner that the grooves 314, 324 formed along the outer peripheral edge of the contact surfaces 313, 323 of the division members 31, 32 are surrounded by the slide dies 14, 24. Protrusions 316, 326, which are integrated with the division members 31, 32, respectively, in the molding process, are formed to protrude in opposed relation with each other in the peripheral edge path 330.

As shown also in FIG. 15, the protrusion 326 has a trapezoidal section at right angles to the length of the resin path 330. The forward end portion (the upper side in the drawing) of the protrusion 326 near to the center of the peripheral edge path 330 is narrower than the root portion (the lower side in the drawing) thereof. Also, as shown in FIG. 16, the protrusion 326 is formed continuously over the entire length of the peripheral edge path 330, or in this embodiment, over the entire periphery of the peripheral edge path 330. Though not shown in FIGS. 15 and 16, the division member 31 is also formed with the protrusion 316 in the same manner as the division member 32 is formed with the protrusion 326.

Also, as shown in FIG. 14, the division member 31 is formed with an annular depression 317 over the entire periphery along the peripheral edge path 330 on the inner side thereof, while the division member 32 is formed with an annular protrusion 327 at a position corresponding to the annular depression 317. At the time of forming the flow path, the annular depression 317 is combined with the annular protrusion 327. As a result, the division members 31 and 32 are set in respective proper positions so as to engage with each other.

The height of the annular protrusion 327 formed in the molding step is larger than the depth of the annular depression 317. When the annular depression 317 is combined with the annular protrusion 327 in the flow path forming step, therefore, the annular protrusion 327 is crushed to some degree. In this way, the molten resin filled in the peripheral edge path 330 in the welding step is prevented from leaking into the hollow component from the boundary of the division members 31, 32.

The molten resin is injected from the nozzle portion of the injection molding machine not shown, and flows into the lead-in flow path 252a from the secondary sprue 133. The molten resin that has passed through the lead-in path 252a branches into the peripheral edge path 331 and the peripheral edge path 332 at the diverging point. When the molten resin flows through the peripheral edge paths 331, 332 (peripheral edge path 330), the heat of the molten resin is transmitted to the surface layer of the division members 31, 32 in contact therewith.

By the heat thus transmitted, the protrusions 316, 326 included in a portion facing the peripheral edge path 330 and having a larger surface-to-volume ratio (the ratio of the contact area in contact with the molten resin with respect to the volume receiving the heat from the molten resin) than the other portions of the division members 31, 32 are mainly melted. The protrusions 316, 326 are formed trapezoidally and, therefore, are melted first from the forward end portion thereof having a larger surface-to-volume ratio. The molten resin that has flown through the peripheral edge path 331 and the molten resin that has passed through the peripheral edge path 332 merge at the confluence and flow into the overflow path 252b.

The molten resin that has been filled in the lead-in path 252a, the peripheral edge paths 331, 332 (the peripheral edge path 330) and the overflow path 252b is cooled with the heat thereof absorbed into the mold A and is solidified into the peripheral resin 33 shown in FIG. 17. In the process, a resin layer, of the protrusions 316, 326 that have been molten, is also solidified and integrated with the peripheral resin 33, so that the division members 31 and 32 are welded with each other through the peripheral resin 33.

The weld width (the weld width in the direction perpendicular to the length (extension) of the peripheral edge path 330) W between the protrusion 326 and the peripheral resin 33 solidified by being filled in the peripheral edge path 330 shown in FIG. 18 is set to 0.25 to 0.4 mm in this embodiment, or 12.5 to 20% of the minimum thickness T (2.0 mm in this embodiment, as shown in FIG. 17) of the division members 31, 32. Though not shown, this is also the case with the weld width W between the peripheral resin 33 and the protrusion 316.

The hollow component 3 develops a pressure difference between the exterior and the interior thereof in operation. The dimensions of respective parts of the hollow component 3, i.e. the division members 31, 32, are determined by taking various conditions (generated stress, etc.) and the workability in the operating environment, into account. The minimum thickness T thereof, however, is determined mainly in consideration of the resistance to the above-mentioned pressure difference (the sealability against the sealing pressure), the external forces and the moldability.

In the hollow component used in an environment generating an interior-exterior pressure difference or subjected to external forces, the weld width W is preferably 5 to 100% of the minimum thickness T of the body of the hollow component. For a weld width W less than 5%, it is difficult to positively seal the interior-exterior pressure difference or resist the external forces. For the weld width W of more than 100%, on the other hand, the hollow component undesirably becomes bulky. Also, in consideration of the weldability, etc., the weld width W is more preferably in the range of 10 to 50% of the minimum thickness T.

The molten resin, when filled in the lead-in path 252a, the peripheral edge paths 331, 332 and the overflow path 252b, is also filled in the cavities 31a, 32a. According to this embodiment, the internal volume of the configuration including the lead-in path 252a, the peripheral edge paths 331, 332 and the overflow path 252b is smaller than that of the cavity 31a or the cavity 32a.

In view of this, the forementioned runner cut mechanism, not shown, is activated at the end of the process of filling the molten resin in the resin lead-in path 252a, the peripheral edge paths 331, 332 and the overflow path 252b while at the same time continuing to inject the molten resin from the injection molding machine not shown, so that the path of the runner 131 connected to the secondary sprue 133 is cut off.

As a result, the molten resin is filled in the cavity 3a under such a pressure as to permit the welding of the division members 31, 32 with each other without breaking the hollow shape defined by the division members 31, 32 (without the molten resin leaking into the hollow space). Thus, the molten resin is supplied into the cavities 31a, 32a under such a pressure that the division members 31, 32 can be formed with high accuracy.

According to the configuration and the molding method described above, in the molding step the protrusions 316, 326 are formed continuously along the length of the peripheral edge path 330 (in the direction of the flow of the resin filled) in the entire length of the grooves 314, 324 providing the peripheral edge path 330 of the division members 31, 32. In the welding step, on the other hand, the resin 33 filled in the peripheral edge path 330 and the protrusions 316, 326 are welded with each other.

Also, the protrusions 316, 326 have a trapezoidal section at right angles to the length of the peripheral edge path 330, so that the heat is easily received at the forward end portion thereof from the filled molten resin while at the same time readily securing the weld width W.

In this way, a weld structure is obtained in which the parts having a high welding strength are continuously formed over the whole periphery along the length of the peripheral edge path 330. Thus, a hollow component 3 is produced which develops a secure overall welding strength and sealability at the weld parts between the division members 31, 32.

The conventional structure in which the peripheral edge path is curved with respect to the length thereof poses the problem that the peripheral edge path is lengthened so that the temperature of the molten resin filled is liable to drop in the downstream area of the resin flow thereby making it difficult to secure the sealability. According to the present invention, by contrast, the peripheral edge path 330 is not curved with respect to the length thereof and, therefore, the sealability is easily secured.

According to the embodiment described above, the preferable range of the weld width W is indicated by the ratio based on the minimum thickness T of the hollow component 3. The present inventors, however, have confirmed that the weld width W can be determined based on the overall welding strength, etc. required of the whole weld parts of the hollow component 3.

Specifically, when letting F be the overall welding strength required of the whole weld parts (between the division members 31, 32) of the hollow component 3, E be the strength of the resin forming the division members 31, 32 or the strength of the resin 33 filled in the peripheral edge path 330, whichever is lower (both the resin strength are the same in this embodiment), and L be the total length of the peripheral edge path 330, the present inventors have confirmed that the hollow component should have the weld width W satisfying the equation below at all the weld parts (all the weld parts between the protrusions 316, 326 and the peripheral resin 33).

$W \geq F/(E \times L)$

In this way, the overall welding strength and sealability can be positively secured as required.

Second Embodiment

Next, a second embodiment of the invention is explained with reference to FIG. 19. According to the second embodiment, the protrusions have a different shape than in the first embodiment described above. In the second embodiment, the component parts identical or similar to those of the first embodiment are designated by the same reference numerals, respectively, and not described again.

Figure 19:
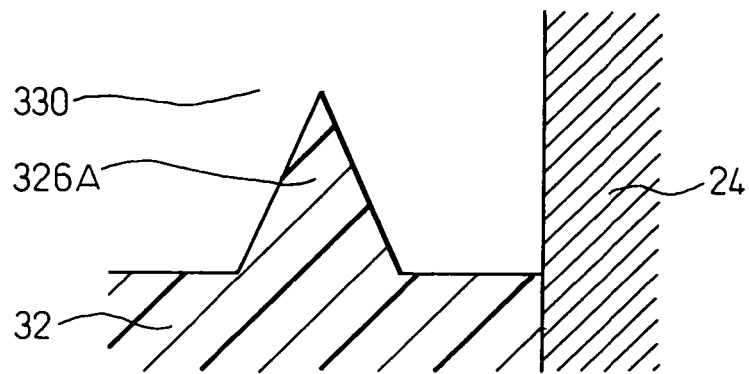
FIG. 19 is a sectional view showing the essential parts according to a second embodiment of the present invention.

FIG. 19 is an enlarged sectional view of the essential parts in the flow path forming step (corresponding to FIG. 15 in the first embodiment). As shown in FIG. 19, a protrusion 326A has a triangular section at right angles to the length of the resin path 330, and the forward end portion (the upper portion in the drawing) of the protrusion 326A nearer to the center of the peripheral edge path 330 has a much larger surface-to-volume ratio than the root portion (the lower portion in the drawing) thereof. Also, as in the protrusions 316, 326 of the first embodiment, the protrusion 326A is formed continuously over the entire periphery along the length of the peripheral edge path 330. Though not shown, the division member 31 is also formed with a protrusion similar to the protrusion 326A of the division member 32.

Once the molten resin is filled in the peripheral edge path 330, the heat of the molten resin is transmitted to the surface layer of the division members 31, 32 in contact therewith. By the heat thus transmitted, the protrusion 326A is melted, which has a larger surface-to-volume ratio than the other parts of the division members 31, 32 also facing the peripheral edge path 330. The protrusion 326A is formed in a triangle and, therefore the forward end portion having a larger surface-to-volume ratio is melted earlier.

After that, the molten resin filled and the molten resin of the protrusion 326A, the heat of which is absorbed into the mold A, are cooled and solidified. Thus, the peripheral resin 33 (not shown in FIG. 19) and the protrusion 326A are welded with each other, thereby forming substantially the same configuration as that of FIG. 18 according to the first embodiment. The protrusion of the division member 31 not shown is also welded to the peripheral resin 33.

In the configuration and the molding method described above, the protrusion 326A has a triangular section perpendicular to the length of the peripheral edge path 330, has the forward end portion liable to receive heat from the molten resin filled and is melt easily and quickly.

Thus, a welding structure is obtained in which the parts of a high welding strength are continuously formed over the entire periphery along the length of the peripheral edge path 330. In this way, a hollow component 3 is produced which stably exhibits a high overall welding strength and sealability at the weld parts of the division members 31, 32. Especially, the sealability is exhibited more quickly than in the first embodiment.

Third Embodiment

Figure 20:
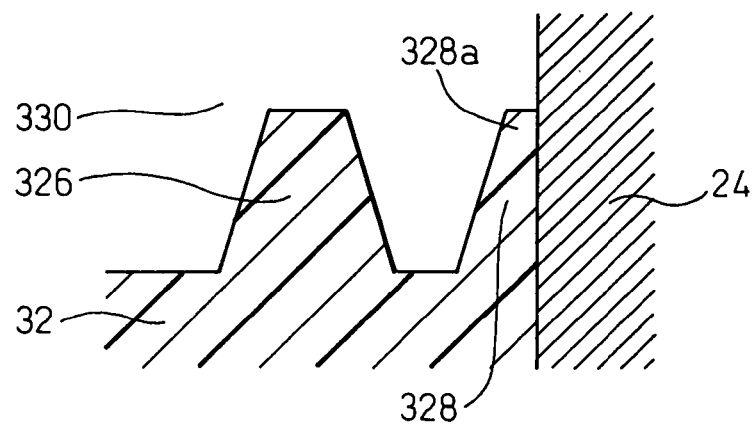
FIG. 20 is a sectional view showing the essential parts according to a third embodiment of the present invention.

Next, a third embodiment of the invention is explained with reference to FIG. 20. The third embodiment is different from the first embodiment in that according to the third embodiment, an adiabatic structure is formed in the peripheral edge path. In FIG. 20, the component parts identical or similar to those of the first embodiment are designated by the same reference numerals, respectively, and not explained again.

As shown in FIG. 20 representing the enlarged sectional view of the essential parts in the flow path forming step (corresponding to FIG. 15 of the first embodiment), the division member 32 is formed with a wall portion 328 at the position in contact with the slide die 24 nearer to the outer periphery than the protrusion 326. The wall portion 328 has substantially the same height as the protrusion 326 and extends longitudinally of the peripheral edge path 330. Though not shown, the wall portion of the division member 31 is formed in the same manner as the wall portion 328 of the division member 32, with the forward ends of the wall portions arranged in spaced and opposed relation with each other.

In this configuration, the wall portion 328 can suppress the heat radiation to the mold A from the molten resin flowing in the peripheral edge path 330 in the welding step. In the welding step, therefore, the temperature of the molten resin flowing from the upstream to the downstream side in the peripheral edge path 330 hardly drops. As a result, a welding structure stable over the whole periphery of the peripheral edge path 330 is easily formed without fail. Not only the wall portion 328 functions as an adiabatic structure, but also the part of the wall portion 328 in the neighborhood of the inner corner 328a thereof functions as a protrusion adapted to weld to the peripheral resin 33 (not shown in FIG. 20).

Further, in view of the fact that the two wall portions of the division members 31, 32 have the forward ends arranged in spaced and opposed relation with each other, the peripheral resin having been filled can be easily confirmed after the welding step.

Fourth Embodiment

Figure 21:
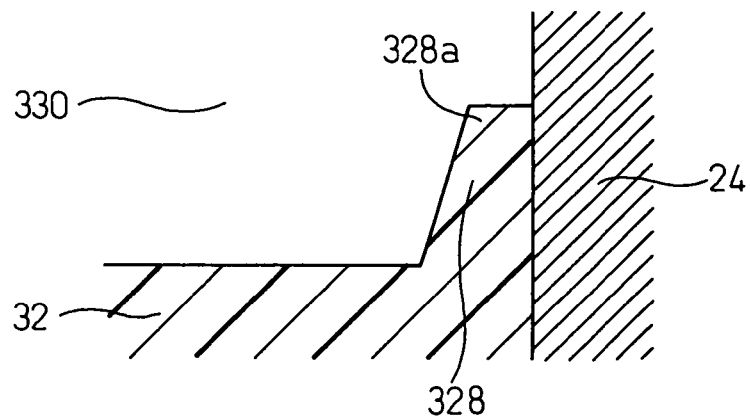
FIG. 21 is a sectional view showing the essential parts according to a fourth embodiment of the present invention.

Next, a fourth embodiment is explained with reference to FIG. 21. The fourth embodiment, unlike the third embodiment, lacks the protrusion 326. In FIG. 21, the component parts identical or similar to those in the first and third embodiments are designated by the same reference numerals, respectively, and not explained again.

As shown in FIG. 21 representing an enlarged sectional view of the essential parts in the flow path forming step (corresponding to FIG. 15 of the first embodiment), the division member 32 is formed with a wall portion 328 extending longitudinally of the peripheral edge path 330 at the position in contact with the slide die 24. In this embodiment, unlike in the third embodiment, the protrusion 326 is not provided. Though not shown, the wall portion of the division member 31 is formed in the same manner as the wall portion 328 of the division member 32, with the two wall portions having the forward ends arranged in spaced and opposed relation with each other.

In this configuration, like in the third embodiment, the wall portion 328 can suppress the heat radiation to the mold A from the molten resin flowing in the peripheral edge path 330. Also, the neighborhood of the inside corner 328a of the wall portion 328 substantially constitutes a protrusion adapted to weld with the peripheral resin 33 (not shown in FIG. 20). In other words, the wall portion 328 functions both as a protrusion for welding and as an adiabatic portion for suppressing the heat radiation Also with forming the wall portion on each of the division members 31, 32, therefore, a weld structure stable over the whole periphery of the peripheral edge path 330 can be formed.

Other Embodiments

In each of the embodiments described above, the protrusions 316, 326, 326A, etc. or the wall portion 328 functioning as a protrusion is arranged over the whole periphery along the peripheral edge path 330. Nevertheless, the protrusions or the wall portion is not necessarily arranged over the whole periphery of the path 330. For example, a protrusion may be formed only in the downstream part of the molten resin flow along the peripheral edge path 330 where a stable weld structure is comparatively difficult to form.

Also, according to the embodiments described above, the protrusions 316, 326, 326A, etc. have a trapezoidal or triangular section. Nevertheless, a substantially trapezoidal or a substantially triangular section can produce substantially the same effects. For example, the protrusions may have a curved surface having a small radius of curvature at a corner thereof. Further, this invention is equally applicable to a protrusion having other than a substantially trapezoidal or substantially triangular section. For example, the cross section of the protrusions may be substantially semicircular in the case where the required overall welding strength or sealability is comparatively low.

Figure 22:
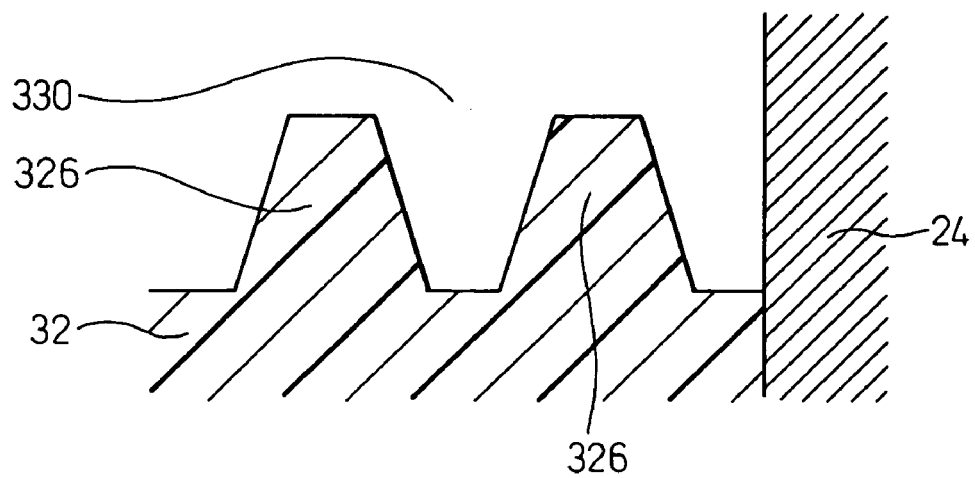
FIG. 22 is a sectional view showing the essential parts according to another embodiment of the present invention.

In the embodiments described above, the protrusions 316, 326, 326A, etc. are each arranged only in a single row on each division member. The protrusions, however, may be formed in a plurality of rows on each division member with equal effect. For example, two rows of the protrusions 326 may be juxtaposed as shown in FIG. 22. In this case, the inner protrusion 326 is for welding to the filled resin, while the outer protrusion 326 has both the function of welding to the filled resin and the function as an adiabatic structure for the resin to be welded to the inner protrusion 326.

Unlike in the third embodiment wherein the wall portion is arranged on each of the division members 31, 32, the wall portion may alternatively be arranged on one of the division members 31, 32.

Figure 23:
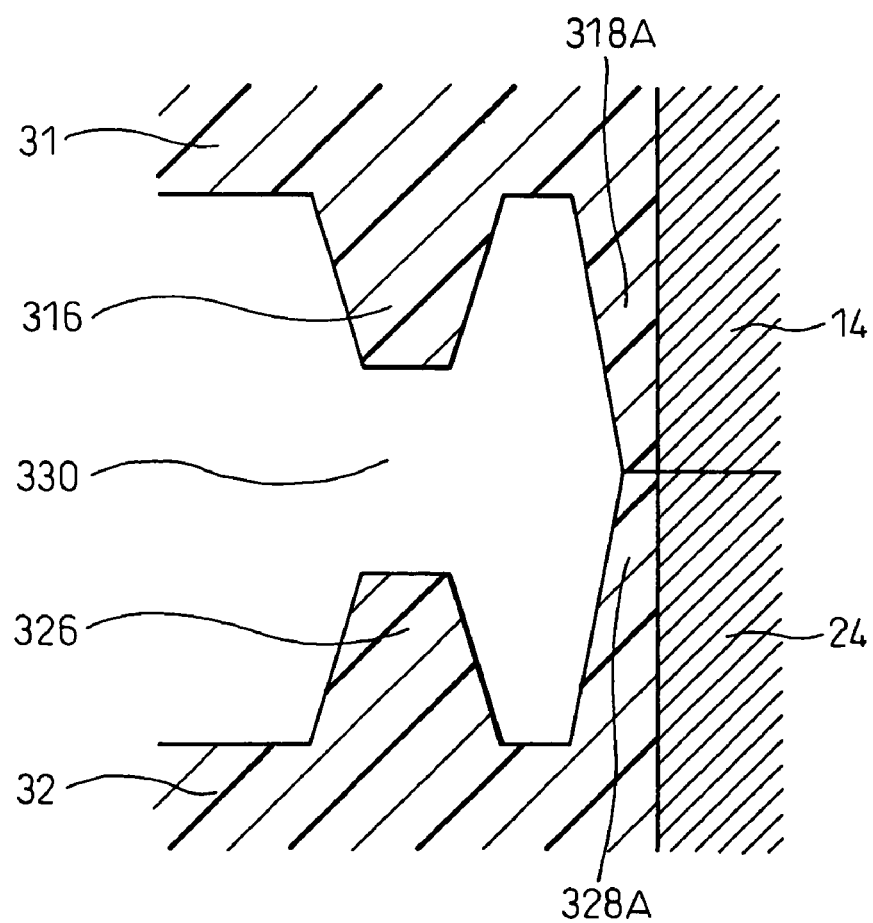
FIG. 23 is a sectional view showing the essential parts according to still another embodiment of the present invention.

Also, in the third embodiment described above, the wall portions of the division members 31, 32 have the forward ends arranged in spaced and opposed relation with each other. As an alternative, as shown in FIG. 23, for example, the forward ends of the wall portions 318A, 328A of the division members 31, 32 may be arranged in contact with each other. With this configuration, the manner in which the peripheral resin is filled cannot be easily confirmed after the welding step. Nevertheless, the heat radiation of the molten resin filled can be suppressed more effectively.

The embodiments described above, which relate to the pump shown in FIG. 2 are not limited to the hollow component 3 of the pump, but may be applicable also to, for example, a hollow component having a hermetically sealed structure without any opening.

Unlike in the aforementioned embodiments with the hollow component 3 molded as two division members, the component may alternatively be constituted of three or more division members.

According to the embodiments described above, the division members 31, 32 and the peripheral resin 33 are made of polyacetal, to which the invention is not limited. Also, the division members 31, 32 and the peripheral resin 33 may be formed of different resin materials, respectively. Even in the case where different resin materials are used, they can be melted together and form a hollow component as long as compatible. The same resin material, however, can share the injection unit and is more preferable.

In each of the embodiments described above, the division members 31, 32 are molded (primary molding process) and welded with each other (secondary molding process) at the same time. As an alternative, the primary molding process and the secondary molding process may be carried out in different dies. Even in this case, the invention is applicable to the secondary molding process with equal effect.

While the invention has been described by reference to specific embodiments chosen for the purposes of illustration, it should be apparent that numerous modifications could be made thereto by those skilled in the art without departing from the basic concept and scope of the invention.

The invention claimed is:

1. A method of molding a hollow component, comprising:
a first molding step for molding a first plurality of division members of a hollow component between first male dies and first female dies formed at different positions inside a mold so as to correspond to said first plurality of division members;
a first welding step for combining said first female dies having said first plurality of division members formed at said first molding step and left in the first female dies, to make said first plurality of division members contact each other, forming resin paths at peripheral edges of contact parts of said first plurality of division members, and filling the resin paths with molten resin to thereby weld said first plurality of division members with each other;

a second molding step for molding a second plurality of division members between second male dies and second female dies formed at different positions inside said mold so as to correspond to said second plurality of division members; and
a second welding step for combining said second female dies having said second plurality of division members formed at said second molding step and left in the second female dies, to make said second plurality of division members contact each other, forming resin paths at peripheral edges of contact parts of said second plurality of division members, and filling the resin paths with molten resin to thereby weld said second plurality of division members with each other, and
alternately repeating a first group of steps simultaneously performing said first molding step and said second welding step and a second group of steps simultaneously performing said second molding step and said first welding step and forming said hollow component each time either of said first group of steps and said second group of steps is performed, wherein a combination position of said first female dies in said first welding step and a combination position of said second female dies in said second welding step are the same position in said mold.

2. A method of molding a hollow component as set forth in claim 1, wherein said mold comprises a fixed die and a movable die mated together at their mating faces when performing said first group of steps and said second group of steps, said fixed die has a fixed side slide member able to slide in a direction of extension of said mating face of said fixed die at said mating face of said fixed die, and said movable die has a movable side slide member able to slide in a direction of extension of said mating face of said movable die at said mating face of said movable die,
one among said first female dies combined at said first welding step is provided at said fixed side slide member and the other is provided at said movable side slide member,
one of said second female dies combined at said second welding step is provided at said fixed side slide member and the other is provided at said movable side slide member, and
said fixed side slide member and said movable side slide member are made to slide in the period between when performing said first group of steps and when performing said second group of steps so as to make the combination position of said first female dies at said first welding step and the combination position of said second female dies at said second welding step said same position.

3. A method of molding a hollow component as set forth in claim 1, wherein one of said first female dies and one of said second female dies respectively have slide cores able to slide for facilitating release of said hollow component, and,
when releasing said hollow component after said first welding step or said second welding step, only said slide core at said same position among said slide cores is made to move.

4. A method of molding a hollow component as set forth in claim 3, wherein said mold is provided with slide core moving means common for said one first female die and said one second female die engaging with said slide cores to make said slide cores move when said mold opens and makes said slide core moving means engage with one slide core at the same position among said slide cores.

5. A method of molding a hollow component as set forth in claim 1, wherein said mold is provided with ejectors provided for ejecting said hollow component from said first female dies and said second female dies and pushing means common for said first female dies and said second female dies for pushing said ejectors to make said ejectors perform an ejection operation, and when releasing said hollow component from the mold after said first welding step or said second welding step, said pushing means are used to push only on ejector at said same position among said ejectors.

\* \* \* \* \*

UNITED STATES PATENT AND TRADEMARK OFFICE
CERTIFICATE OF CORRECTION

| | | |
|---|---|---|
| PATENT NO. | : 7,604,764 B2 | Page 1 of 1 |
| APPLICATION NO. | : 10/850597 | |
| DATED | : October 20, 2009 | |
| INVENTOR(S) | : Arai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 25 days.

Signed and Sealed this

Fifth Day of October, 2010

David J. Kappos
*Director of the United States Patent and Trademark Office*